(12) United States Patent
Bishop et al.

(10) Patent No.: US 8,832,649 B2
(45) Date of Patent: Sep. 9, 2014

(54) SYSTEMS AND METHODS FOR AUGMENTING THE FUNCTIONALITY OF A MONITORING NODE WITHOUT RECOMPILING

(75) Inventors: Doug Bishop, Phoenix, AZ (US); Tim Felke, Glendale, AZ (US); Jeff Vanderzweep, Peoria, AZ (US); Doug Bell, Phoenix, AZ (US); Miroslav Krupa, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 179 days.

(21) Appl. No.: 13/477,735

(22) Filed: May 22, 2012

(65) Prior Publication Data

US 2013/0318529 A1   Nov. 28, 2013

(51) Int. Cl.
*G06F 9/44* (2006.01)

(52) U.S. Cl.
USPC ............................ 717/120; 717/107

(58) Field of Classification Search
CPC ... G06F 9/4843; G06F 9/4856; G06F 9/4881; G06F 9/52; G06F 13/00; G06F 13/1652; G06F 13/1657; G06F 13/14; G06F 15/163; G06F 15/17; G06F 15/173; G06F 15/17331; G06F 15/17337; G06F 15/17362
USPC ................. 717/101–178; 718/100; 713/150
See application file for complete search history.

(56) References Cited

U.S. PATENT DOCUMENTS

| | | | |
|---|---|---|---|
| 4,047,162 A | 9/1977 | Dorey et al. | |
| 4,296,409 A | 10/1981 | Whitaker et al. | |
| 4,890,284 A | 12/1989 | Murphy et al. | |
| 5,020,135 A | 5/1991 | Kasparian et al. | |
| 5,086,429 A | 2/1992 | Gray et al. | |
| 5,550,736 A | 8/1996 | Hay et al. | |
| 5,754,823 A * | 5/1998 | Mudryk et al. | 710/8 |
| 5,881,270 A | 3/1999 | Worthington et al. | |
| 5,884,077 A | 3/1999 | Suzuki | |
| 5,941,918 A | 8/1999 | Blosser | |
| 6,094,609 A | 7/2000 | Arjomand | |

(Continued)

FOREIGN PATENT DOCUMENTS

| | | |
|---|---|---|
| EP | 1933563 A1 | 6/2008 |
| EP | 2482159 A2 | 8/2012 |
| EP | 2527977 A2 | 11/2012 |
| WO | 2005025194 A1 | 3/2005 |

OTHER PUBLICATIONS

EP Search Report dated Feb. 7, 2013 for EP 12 187 309.5.
EP Office Action dated Feb. 19, 2013 for EP 12 187 309.5.

(Continued)

*Primary Examiner* — Lewis A Bullock, Jr.
*Assistant Examiner* — Francisco Aponte
(74) *Attorney, Agent, or Firm* — Ingrassia Fisher & Lorenz, P.C.

(57) ABSTRACT

Systems, methods are provided for augmenting functions of a computing device by a controlling computing device. The method comprises receiving a command and a data matrix from the controlling computing device. The data matrix contains data that when installed enables the subordinate computing device to accomplish additional functions. The method further comprises calling a first SEAM by the computing device to receive the command and the data matrix, calling a second SEAM by the computing device to create a SDS extension in its volatile memory, and populating the one or more volatile extensions with the data from the data matrix.

12 Claims, 14 Drawing Sheets

(56) References Cited

U.S. PATENT DOCUMENTS

| | | | |
|---|---|---|---|
| 6,104,803 A * | 8/2000 | Weser et al. | 379/230 |
| 6,128,560 A | 10/2000 | Ishii | |
| 6,185,613 B1 | 2/2001 | Lawson et al. | |
| 6,353,896 B1 | 3/2002 | Holzmann et al. | |
| 6,401,098 B1 | 6/2002 | Moulin | |
| 6,434,455 B1 | 8/2002 | Snow et al. | |
| 6,438,470 B1 | 8/2002 | Hiramatsu | |
| 6,493,616 B1 | 12/2002 | Rossow et al. | |
| 6,615,090 B1 | 9/2003 | Blevins et al. | |
| 6,624,909 B1 | 9/2003 | Czyszczewski et al. | |
| 6,728,611 B2 | 4/2004 | Kamiya | |
| 6,757,897 B1 | 6/2004 | Shi et al. | |
| 6,766,230 B1 | 7/2004 | Rizzoni et al. | |
| 6,789,007 B2 | 9/2004 | Ellis et al. | |
| 6,823,512 B1 | 11/2004 | Miller et al. | |
| 6,832,141 B2 | 12/2004 | Skeen et al. | |
| 6,904,483 B2 | 6/2005 | Koning et al. | |
| 6,910,156 B2 | 6/2005 | Adam | |
| 6,928,358 B2 | 8/2005 | Brooks et al. | |
| 6,937,926 B2 | 8/2005 | Lipscomb et al. | |
| 6,950,782 B2 | 9/2005 | Qiao et al. | |
| 7,065,050 B1 | 6/2006 | Herbst | |
| 7,072,879 B2 | 7/2006 | Soemo et al. | |
| 7,079,984 B2 | 7/2006 | Eryurek et al. | |
| 7,124,302 B2 * | 10/2006 | Ginter et al. | 713/189 |
| 7,142,953 B2 | 11/2006 | Marshall et al. | |
| 7,188,207 B2 | 3/2007 | Mitter | |
| 7,209,817 B2 | 4/2007 | Abdel-Malek et al. | |
| 7,222,800 B2 | 5/2007 | Wruck | |
| 7,237,223 B2 | 6/2007 | Leu et al. | |
| 7,272,475 B2 | 9/2007 | Gawlik et al. | |
| 7,295,903 B2 | 11/2007 | Siebel et al. | |
| 7,319,947 B1 | 1/2008 | Khaira et al. | |
| 7,349,825 B1 | 3/2008 | Williams et al. | |
| 7,363,420 B2 | 4/2008 | Lin et al. | |
| 7,379,799 B2 | 5/2008 | Cleary et al. | |
| 7,379,845 B2 | 5/2008 | Gorinevsky et al. | |
| 7,415,606 B2 * | 8/2008 | Tuvell et al. | 713/151 |
| 7,444,216 B2 | 10/2008 | Rogers et al. | |
| 7,447,643 B1 * | 11/2008 | Olson et al. | 705/2 |
| 7,493,482 B2 | 2/2009 | Ring et al. | |
| 7,522,979 B2 | 4/2009 | Pillar | |
| 7,523,133 B2 | 4/2009 | Mackie | |
| 7,593,403 B2 | 9/2009 | Kalkunte et al. | |
| 7,596,785 B2 | 9/2009 | Burkhardt et al. | |
| 7,606,843 B2 | 10/2009 | Alexander et al. | |
| 7,617,029 B2 | 11/2009 | Loda | |
| 7,710,871 B2 | 5/2010 | Lavian et al. | |
| 7,757,120 B2 | 7/2010 | Ogle et al. | |
| 7,761,201 B2 | 7/2010 | Avery et al. | |
| 7,779,039 B2 | 8/2010 | Weissman et al. | |
| 7,929,562 B2 | 4/2011 | Petrovykh | |
| 7,950,017 B1 | 5/2011 | Cain et al. | |
| 7,990,857 B2 | 8/2011 | Jain et al. | |
| 8,054,208 B2 | 11/2011 | Fletcher et al. | |
| 8,135,995 B2 | 3/2012 | Ngai et al. | |
| 8,145,444 B1 | 3/2012 | Bickford et al. | |
| 8,151,141 B1 | 4/2012 | Bennett et al. | |
| 8,180,594 B2 | 5/2012 | Stephan | |
| 8,214,317 B2 | 7/2012 | Aguilar et al. | |
| 8,265,980 B2 | 9/2012 | Ochs et al. | |
| 8,468,601 B1 | 6/2013 | Bakhmutov | |
| 8,533,536 B2 | 9/2013 | Yan et al. | |
| 8,615,773 B2 * | 12/2013 | Bishop et al. | 719/318 |
| 2002/0004694 A1 | 1/2002 | Mcleod et al. | |
| 2002/0007237 A1 | 1/2002 | Phung et al. | |
| 2002/0023118 A1 | 2/2002 | Peled et al. | |
| 2002/0095597 A1 | 7/2002 | Norden et al. | |
| 2002/0133651 A1 * | 9/2002 | Wang et al. | 710/104 |
| 2004/0030649 A1 * | 2/2004 | Nelson et al. | 705/44 |
| 2004/0117791 A1 | 6/2004 | Prasad et al. | |
| 2005/0038581 A1 | 2/2005 | Kapolka et al. | |
| 2005/0060396 A1 | 3/2005 | Hirooka | |
| 2005/0211072 A1 | 9/2005 | Lu et al. | |
| 2005/0246719 A1 | 11/2005 | Oshins et al. | |
| 2006/0095394 A1 | 5/2006 | Miller et al. | |
| 2006/0200738 A1 | 9/2006 | Tarle et al. | |
| 2007/0010923 A1 | 1/2007 | Rouyre | |
| 2007/0022403 A1 | 1/2007 | Brandt et al. | |
| 2007/0050719 A1 | 3/2007 | Lui et al. | |
| 2007/0100520 A1 | 5/2007 | Shah et al. | |
| 2007/0124189 A1 | 5/2007 | Stoughton et al. | |
| 2007/0226540 A1 | 9/2007 | Konieczny | |
| 2008/0059621 A1 | 3/2008 | Raghavan et al. | |
| 2008/0098351 A1 | 4/2008 | Weatherhead et al. | |
| 2008/0119981 A1 | 5/2008 | Chen | |
| 2008/0125877 A1 | 5/2008 | Miller et al. | |
| 2008/0125933 A1 | 5/2008 | Williams et al. | |
| 2008/0163172 A1 | 7/2008 | Rossmann et al. | |
| 2008/0250118 A1 | 10/2008 | Ray | |
| 2009/0113088 A1 | 4/2009 | Illowsky et al. | |
| 2009/0138139 A1 | 5/2009 | Tsai et al. | |
| 2009/0138141 A1 | 5/2009 | Nwadiogbu et al. | |
| 2009/0228519 A1 | 9/2009 | Purcell et al. | |
| 2009/0249215 A1 | 10/2009 | Paek | |
| 2009/0265055 A1 | 10/2009 | Gillies | |
| 2009/0289756 A1 | 11/2009 | Raichle et al. | |
| 2009/0295559 A1 | 12/2009 | Howell et al. | |
| 2009/0300472 A1 | 12/2009 | Ambrosino et al. | |
| 2010/0005470 A1 | 1/2010 | Simon et al. | |
| 2010/0010702 A1 | 1/2010 | Gilbert | |
| 2010/0042283 A1 | 2/2010 | Kell et al. | |
| 2010/0043003 A1 | 2/2010 | Valdez et al. | |
| 2010/0131241 A1 | 5/2010 | Dal Bello et al. | |
| 2010/0138515 A1 | 6/2010 | Ruiz-Velasco et al. | |
| 2010/0192005 A1 | 7/2010 | Das et al. | |
| 2010/0217479 A1 | 8/2010 | Dahl et al. | |
| 2010/0217638 A1 | 8/2010 | Dickson et al. | |
| 2010/0229044 A1 | 9/2010 | Fountain et al. | |
| 2010/0281119 A1 | 11/2010 | Durai | |
| 2011/0010130 A1 | 1/2011 | Hadden et al. | |
| 2011/0023079 A1 | 1/2011 | Schultz et al. | |
| 2011/0060946 A1 | 3/2011 | Gupta et al. | |
| 2011/0077817 A1 | 3/2011 | Sun et al. | |
| 2011/0118905 A1 | 5/2011 | Mylaraswamy et al. | |
| 2011/0191099 A1 | 8/2011 | Farmaner et al. | |
| 2012/0023499 A1 | 1/2012 | Biran et al. | |
| 2012/0079005 A1 * | 3/2012 | Dent et al. | 709/203 |
| 2012/0150474 A1 | 6/2012 | Rentschler et al. | |
| 2012/0151272 A1 | 6/2012 | Behrendt et al. | |
| 2012/0158783 A1 | 6/2012 | Nice et al. | |
| 2012/0198220 A1 * | 8/2012 | Felke et al. | 713/2 |
| 2012/0254876 A1 * | 10/2012 | Bishop et al. | 718/102 |
| 2012/0272099 A1 | 10/2012 | Keith, Jr. | |
| 2012/0304164 A1 * | 11/2012 | van der Zweep et al. | 717/174 |
| 2013/0023203 A1 | 1/2013 | Kakaire | |
| 2013/0073698 A1 | 3/2013 | Ling et al. | |
| 2013/0097414 A1 * | 4/2013 | Bishop et al. | 713/100 |
| 2013/0097459 A1 * | 4/2013 | Bell et al. | 714/37 |

OTHER PUBLICATIONS

USPTO Office Action for U.S. Appl. No. 13/077,276 dated Feb. 8, 2013.

USPTO Notice of Allowance for U.S. Appl. No. 13/077,276 dated Apr. 12, 2013.

Bishop D.L., et al; Systems and Methods for Coordinating Computing Functions to Accomplish a Task, filed Jun. 14, 2013, U.S. Appl. No. 13/918,584.

USPTO Office Action for U.S. Appl. No. 13/273,984 dated Nov. 4, 2013.

USPTO office action for U.S. Appl. No. 13/016,601 dated Nov. 8, 2013.

USPTO Notice of Allowance for U.S. Appl. No. 13/077,276 dated Oct. 17, 2013.

Fletcher, et al.; Re-Configurable Multipurpose Digital Interface, filed Apr. 27, 2010 and assigned U.S. Appl. No. 12/768,448.

Fletcher, et al.; Re-Configurable Multipurpose Analog Interface, filed Mar. 30, 2010 and assigned U.S. Appl. No. 12/750,341.

Goldstein, et al.; Vehicle System Monitoring and Communications Architecture, filed Jun. 29, 2009 and assigned U.S. Appl. No. 12/493,750.

(56) References Cited

OTHER PUBLICATIONS

Felke, et al.; Methods and Reconfigurable Systems to Optimize the Performance of a Condition Based Health Maintenance System, filed Jan. 28, 2011 and assigned U.S. Appl. No. 13/016,601.
Bishop, et al.; Systems and Methods for Coordinating Computing Functions to Accomplish a Task, filed Mar. 31, 2011 and assigned U.S. Appl. No. 13/077,276.
Van Der Zweep, et al.; Systems and Methods to Configure Condition Based Health Maintenance Systems, filed May 25, 2011 and assigned U.S. Appl. No. 13/115,690.
Bell, et al.; Methods and Systems for Distributed Diagnostic Reasoning, filed Oct. 14, 2011, and assigned U.S. Appl. No. 13/273,984.
USPTO Office Action for U.S. Appl. No. 13/115,690 dated Jun. 7, 2013.
Coalition Solutions Integrated, Inc.—Products & Services; Program Management / Information Technology (IT); URL: http://coalitionsolutions.com/products2.html; retreived from the internet on Dec. 7, 2010.
Bell, D. A., et al.: "Method for Performing Condition Based Data Acquisition in a Hierarchically Distributed Condition Based Maintenance System" filed Sep. 28, 2012 and assigned U.S. Appl. No. 13/630,906.
NPL: Bishop, D. L.: Systems and Methods for Limiting User Customization of Task Workflow in a Condition Based Health Maintenance System, filed Aug. 10, 2012 and assigned U.S. Appl. No. 13/572,518.
EP Search Report for Application No. EP 13 184 653.7 dated Feb. 25, 2014.
USPTO Notice of Allowance for U.S. Appl. No. 13/016,601 dated Feb. 12, 2014.
USPTO Notice of Allowance, Notification Date May 13, 2014; U.S. Appl. No. 13/572,518.
USPTO Office Action, Notification Date Jun. 13, 2014; U.S. Appl. No. 13/115,690.

\* cited by examiner

SYSTEMS AND METHODS FOR AUGMENTING THE FUNCTIONALITY OF A MONITORING NODE WITHOUT RECOMPILING

TECHNICAL FIELD

The present invention generally relates to architectures for condition based health maintenance systems, and more particularly relates to systems and methods for instituting a maintainer interface node within a condition based health maintenance system for monitoring a complex system.

BACKGROUND

Increases in vehicle complexity and the accompanying increase in maintenance costs have led to industry wide investments into the area of condition based health maintenance (CBM). These efforts have led to the development of industry or equipment specific process solutions. However, conventional CBM systems are generally rigidly configured, which can result in cumbersome performance or users pay significant modification costs.

FIG. 1 is a simplified block diagram of an exemplary multi-level health maintenance process 10 that may be useful in monitoring a complex system (not shown). A complex system as discussed herein may be any type of vehicle, aircraft, manufacturing process, or machine that may utilize sensors, transducers or other data sources to monitor the various components and parameters of the complex system. The sensors/transducers are typically situated at the component or the process measurement level 20 to measure, collect and communicate raw data through a variety of data driven input/output (I/O) devices. This raw data may represent fault indicators, parametric values, process status and events, consumable usage and status, interactive data and the like. Non-limiting examples of other data sources may include serial data files, video data files, audio data files and built in test equipment.

Once the parameters of the complex system are measured, the measurement data is typically forwarded to more sophisticated devices and systems at an extraction level 30 of processing. At the extraction level 30, higher level data analysis and recording may occur such as the determination or derivation of trend and other symptom indicia.

Symptom indicia are further processed and communicated to an interpretation level 40 where an appropriately programmed computing device may diagnose, prognosticate default indications or track consumable usage and consumption. Raw material and other usage data may also be determined and tracked.

Data synthesized at the interpretation level 40 may then be compiled and organized by maintenance planning, analysis and coordination software applications at an action level 50 for reporting and other interactions with a variety of users at an interaction level 60.

Although processes required to implement a CBM system are becoming more widely known, the level of complexity of a CBM system remains high and the cost of developing these solutions is commensurately high. Attempts to produce an inexpensive common CBM solution that is independent from the design of the complex system that is being monitored have been less than satisfying. This is so because the combination and permutations of the ways in which a complex system can fail and the symptoms by which the failures are manifested are highly dependent on the system design.

Accordingly, it is desirable to develop a health maintenance system architecture that is sufficiently flexible to support a range of complex systems. In addition, it is desirable to develop a health maintenance system that may be easily reconfigured by a user in real time, thus dispensing with prohibitive reprogramming costs and delays. Furthermore, other desirable features and characteristics of the present invention will become apparent from the subsequent detailed description of the invention and the appended claims, taken in conjunction with the accompanying drawings and this background of the invention.

BRIEF SUMMARY

A system is provided for extending the functionality of a subordinate computing device without re-compiling code. The system comprises a controlling computing device, wherein the controlling computing device and the subordinate computing device each comprise a first plurality of standardized executable application modules (SEAMs), each SEAM configured to execute on a processor to provide a unique function and to generate an event associated with the unique function associated with each SEAM and a computer readable storage medium having a configuration file recorded thereon, the computer readable storage medium comprising: a dynamic data store (DDS) and a static data store (SDS). The DDS comprises an event queue, one or more response queues and one or more unused storage locations, and the SDS comprises a persistent software object configured to map a specific event from the event queue to a pre-defined response record, and to assign a response queue into which the pre-defined response record is to be placed. The system further comprises a workflow service module configured to direct communication between the SDS, the DDS and each of the first plurality of SEAMs. The controlling computing device is configured to transmit a command and a data matrix containing data to the subordinate computing device, and the subordinate computing device is configured to create a linked extension of the SDS in an unused storage location of the DDS in response to the command and to populate the extension of SDS with the data contained in the data matrix.

A method is provided for augmenting functions of a subordinate computing device by a controlling computing device where the subordinate computing device and the controlling computer device both include a workflow service, a dynamic data store (DDS), a static data store (SDS), and are both populated by at least a first set of standardized executable application modules (SEAMs). The method comprises receiving a command and a function augmentation data matrix from the controlling computing device, wherein the function augmentation data matrix contains data that when installed in the DDS of the subordinate computing device enables the subordinate computing device to accomplish additional functions. The method also comprises calling a first SEAM by the subordinate computing device, the first SEAM being configured to receive the command and the function augmentation data matrix, calling a second SEAM by the subordinate computing device, the second SEAM being configured to create one or more SDS extensions in its DDS, and populating the one or more DDS extensions with the data from the function augmentation data matrix.

A computer readable medium storage device is provided for. The computer readable storage device contains instructions that when executed augments the functions of a subordinate computing device by a controlling computing device where the subordinate computing device and the controlling computer device both include a workflow service, a dynamic data store (DDS), a static data store (SDS), and are both populated by at least a first set of standardized executable application modules (SEAMs). The steps comprise receiving a command and a function augmentation data matrix from the controlling computing device, wherein the function augmentation data matrix contains data that when installed in the DDS of the subordinate computing device enables the subordinate computing device to accomplish additional functions. The steps further comprise calling a first SEAM by the subordinate computing device, the first SEAM being configured to receive the command and the function augmentation data matrix, calling a second SEAM by the subordinate computing device, the second SEAM being configured to create one or more SDS extensions in its DDS, and populating the one or more DDS extensions with the data from the function augmentation data matrix.

BRIEF DESCRIPTION OF THE DRAWINGS

The present invention will hereinafter be described in conjunction with the following drawing figures, wherein like numerals denote like elements.

DETAILED DESCRIPTION

Figure 1:
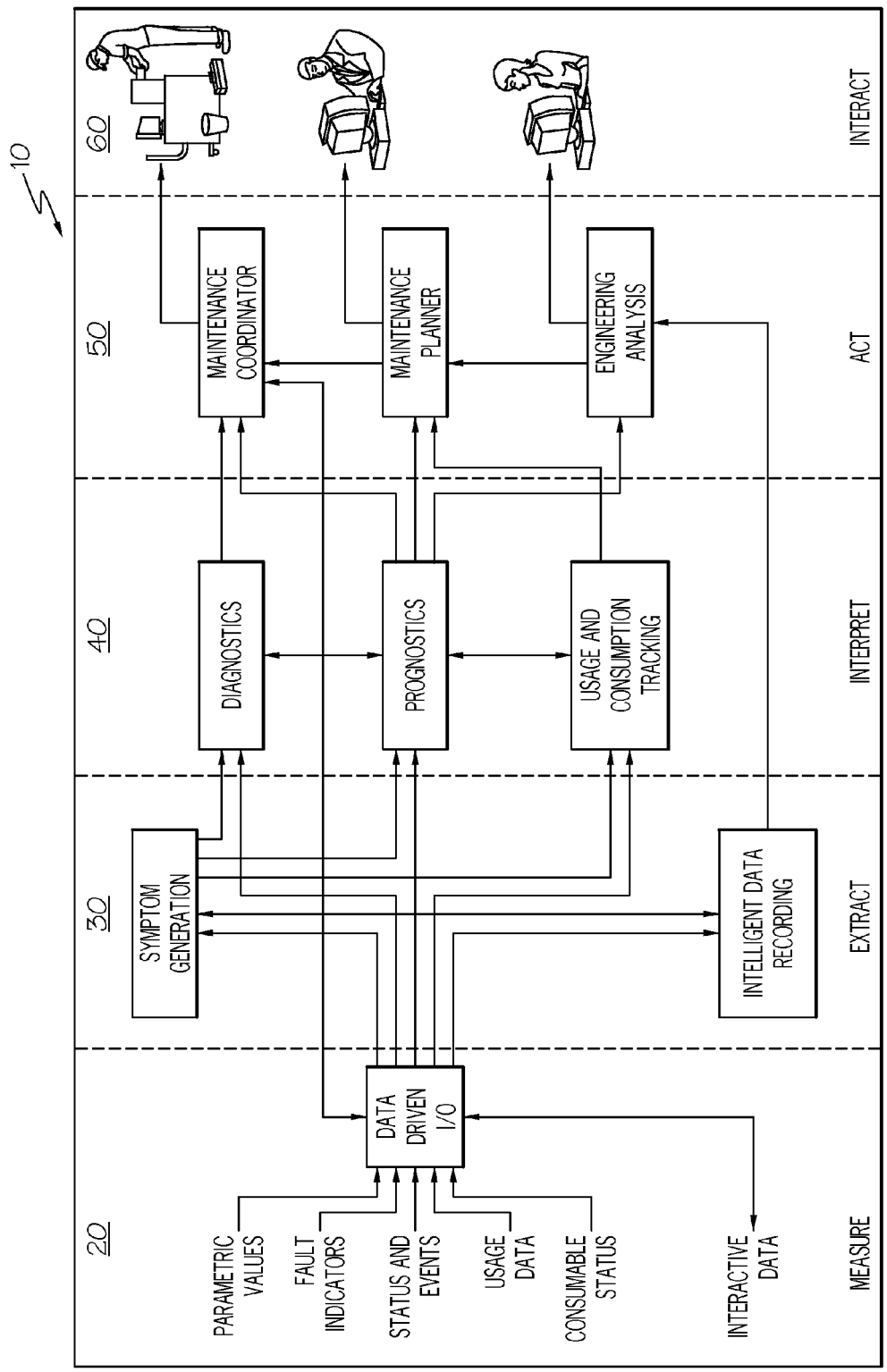
FIG. 1 is a simplified block diagram of a conventional multi-level health maintenance process.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, software executable by a computing device, or combinations of both. Some of the embodiments and implementations are described below in terms of functional and/or logical block components (or modules) and various processing steps. However, it should be appreciated that such block components (or modules) may be realized by any number of hardware and/or firmware components configured to perform the specified functions. To clearly illustrate this interchangeability of hardware and software, various illustrative components, blocks, modules, circuits, and steps are described herein generally in terms of their functionality. However, it should be understood that software cannot exist without hardware with which to execute the software. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a controller, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module with instructions executed by a processor, or in a combination of the two. A software module may reside in RAM memory, flash memory, ROM memory, EPROM memory, EEPROM memory, registers, hard disk, a removable disk, a CD-ROM, or any other form of computer readable storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment will be presented in the following detailed description, it should be appreciated that a vast number of variations exist. It should also be appreciated that the exemplary embodiment or exemplary embodiments are only examples, and are not intended to limit the scope, applicability, or configuration of the invention in any way. Rather, the following detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

Figure 2:
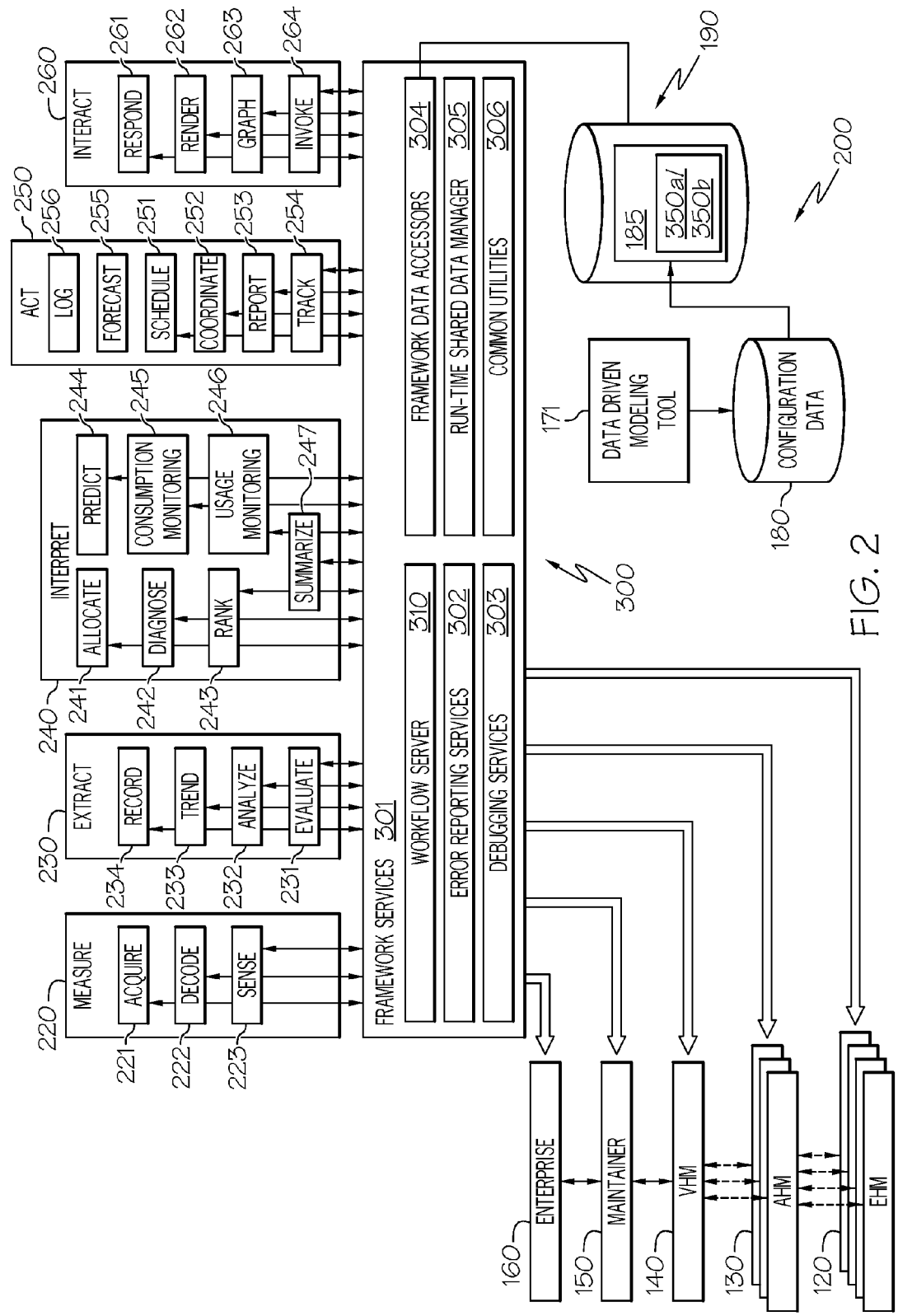
FIG. 2 is a simplified functional block diagram for embodiments of a hierarchical condition based maintenance system for monitoring a complex system.

FIG. 2 is a simplified functional block diagram for embodiments of a hierarchical structure 200 that may be timely reconfigured by a user. This may be accomplished by altering a set of configuration data 180 via a data driven modeling tool 171, which also may be described as a model based configuration means. The configuration data 180 may be stored in a static data store (e.g. an EEPROM), a dynamic data store (e.g. RAM), or both 190.

In light of the plethora of complex systems that may be monitored by the embodiments being described herein below and the wide range of functionality that may be desired at any point in the complex system, the following description contains non-limiting examples of the subject matter being disclosed herein. A specific non-limiting example of a complex system that may complement the following exemplary embodiments may be the vehicle as described in co-owned, co-pending application Ser. No. 12/493,750, which is assigned to the assignee of the instant application.

For the sake of brevity and simplicity, the present example will be assumed to have only five different processing levels or "application layers." An Application Layer (120-160) is a set of functions or services programmed into run-time software resident in one or more computing nodes sharing a particular hierarchical level and which is adapted to meet the needs of a user concerning a particular health management implementation. As non-limiting examples, an application layer may be an Equipment Health Manager (EHM) Layer 120, an Area Health Manager (AHM) Layer 130, a Vehicle Heath Manager (VHM) Layer 140, a Maintainer Layer 150, or an Enterprise Layer 160.

However, in equivalent embodiments discussed herein, the hierarchical structure 200 may have any number of levels of application layers (120-160). Application layers (120-160) may include any number of computing nodes, which are computing devices. The number of nodes is determined by the complexity of the complex system and the sophistication of the monitoring desired by the user. In some embodiments, multiple nodes (120'-160') may be resident in one computing device. The computing nodes of the equipment based layers (EHM Layer 120, AHM Layer 130, VHM Layer 140, Maintainer layer 150 and Enterprise layer 160) may be also referred to as an EHM node 120', an AHM node 130', a VHM node 140', a maintainer node 150' and an enterprise node 160'.

In the exemplary embodiments disclosed herein, an EHM node 120' is a computing device that provides an integrated view of the status of a single component of the monitored assets comprising the lowest level of the hierarchical structure 200. The EHM node 120' may have different nomenclature favored by others. For example, in equivalent embodiments the EHM node 120' also be known as a Component Area Manager (CAM). A complex system may require a large number of EHM nodes (120'), each of which may include multiple times series generation sources such as sensors, transducers, Built-In-Test-Equipment (BITE) and the like. EHM nodes (120') are preferably located in electronic proximity to a time series data generation source in order to detect symptomatic times series patterns when they occur.

An AHM node 130' is a computing device situated in the next higher hierarchical level of the hierarchical structure 200 and may receive and process message, command and data inputs received from a number of EHM nodes 120' and other nodes 130'-160'. An AHM node 130' may report and receive commands and data from higher level or lower level components of the hierarchical structure 200. An AHM node 130' processes data and provides an integrated view of the health of a single sub-system of the complex system being monitored. The AHM node 130' may have different nomenclature favored by others. For example, in equivalent embodiments the AHM node 130' also be known as a Sub-system Area Manager (SAM).

A VHM node 140' is a computing device situated in the next higher hierarchical level for the hierarchical structure 200 and may receive and process message, command and data inputs received from a number of EHM nodes 120' and AHM nodes 130'. A VHM node 140' may report and receive commands and data from higher level components of the hierarchical structure 200 as well. A VHM node 140' processes data and provides an integrated view of the health of the entire complex system being monitored. The VHM node 140' may have different nomenclature favored by others. For example, in equivalent embodiments the VHM node 140' also be known as a system level control manager (SLCM).

A Maintainer Layer 150 contains one or more maintainer computing nodes (150') that analyze data received from the EHM nodes (120'), AHM nodes 130' and VHM nodes node 140' and supports local field maintenance activities. Non-limiting examples of an Maintainer Level computing system is the Windows® PC ground based station (PC-GBS) software produced by Intelligent Automation Corporation a subsidiary of Honeywell International of Morristown, N.J.; or the US Army's Platform Soldier-Mission Readiness System (PS-MRS). The Maintainer Layer system may have different nomenclature favored by others. MNT nodes 150' also receive data, commands and messages from higher level nodes 160'.

A maintainer node 150' may be permanently or removably inserted at a particular electronic and/or physical location within the hierarchical structure 200. A maintainer node 150' may also be any suitable portable computing device or a stationary computing device that may be connected physically or electronically at any particular node (120'-160') or other point of access with in the hierarchical system 200. Thus, a maintenance technician is not bound to a particular location in the hierarchical system from which to monitor the complex system.

Figure 4:
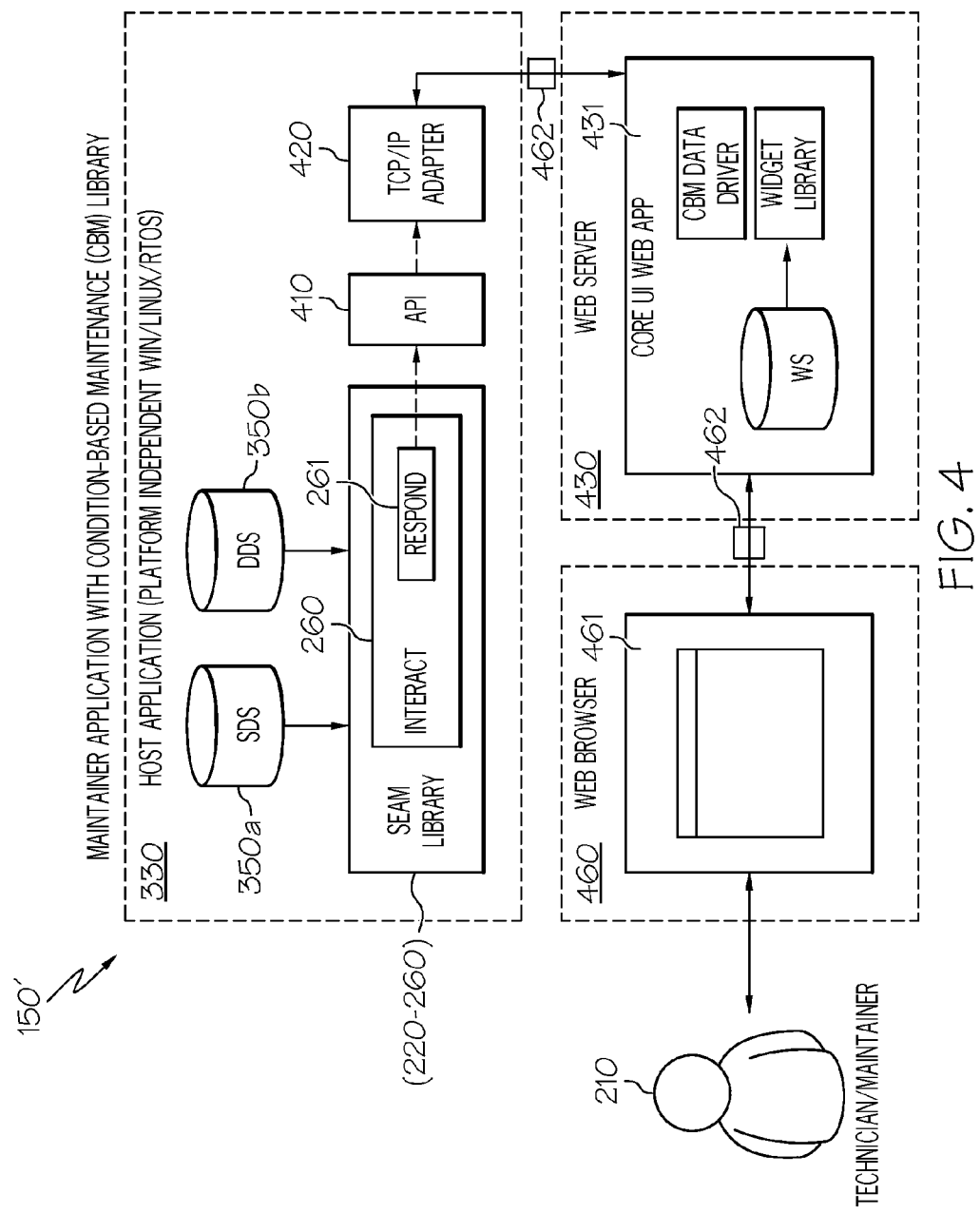
FIG. 4 is a block diagram of an exemplary web based interface connecting the maintainer node to the host application of a Maintainer node.

The maintainer node 150' may communicate information to and from the maintenance technician using a user interface over a hard wired connection 462, a wireless connection 462 and may be internet based, thus allowing the use of web pages in common TCP/IP format (See, FIG. 4). In order to communicate between a technician and the hierarchical system 200, the maintainer node 150' comprises a user interface web application 461 that is responsible for data processing, rendering web pages to the technician and receiving technician requests. In equivalent embodiments, the maintainer node 150' may connect to the user interface web application 461 via web browser executing on a web server (not shown).

An Enterprise Layer 160 contains one or more computing nodes (160') that analyze data received from the EHM nodes 120', AHM nodes 130', VHM nodes 140' and the Maintainer Layer 150. The Enterprise level supports the maintenance, logistics and operation of a multitude or fleet of assets. Non-limiting examples of an Enterprise Layer 160 computing system is the ZING™ system and the Predictive Trend Monitoring and Diagnostics System from Honeywell International. The Enterprise layer 160 may have different nomenclature favored by others.

In accordance with the precepts of the subject matter disclosed herein, each computing node (120'-160') of each level of the hierarchical structure 200 may be individually and timely configured or reconfigured by the user by way of the data driven modeling tool 171. The data driven modeling tool 171 allows a user to directly alter the configuration data 180, which in turn provides specific direction and data to, and/or initiates, one or more standardized executable application modules (SEAMs) (221-264) resident in each computing node (120'-160') of the hierarchical structure 200 via the model driven GUI 170. In the following description the term "configure" and "provide specific direction and data" may be used synonymously.

The number of SEAMs (221-264) is not limited and may be expanded beyond the number discussed herein. Similarly, the SEAMs (221-264) discussed herein may be combined into fewer modules or broken down into component modules as may be required without departing from the scope of the disclosure herein. The SEAMs (221-264) are a set of run-time software that are selectable from one or more re-use libraries (220-260) and are subsequently directed to meet the health management implementation needs of a user. Each SEAM (221-264) contains executable code comprising a set of logic steps defining standardized subroutines designed to carry out a basic function that may be directed and redirected at a later time to carry out a specific functionality.

There are 24 exemplary SEAMs (221-264) discussed herein that are selected from five non-limiting, exemplary libraries: a Measure Library 220, an Extract Library 230, an Interpret Library 240, an Act Library 250 and an Interact Library 260. The SEAMs (221-264) are basic un-modifiable modular software objects that are directed to complete specific tasks via the configuration data 180 after the SEAMs (221-264) are populated within the various nodes (120'-160') of the hierarchical structure 200. The configuration data 180 is implemented in conjunction with a SEAM (221-264) via the delivery to a node (120'-160') of a configuration file 185 containing the configuration data 180. Once configured, the SEAMs (221-264) within the node may then cooperatively perform a specific set of functions on data collected from the complex system. A non-limiting example of a specific set of functions may be a health monitoring algorithm.

As non-limiting examples, the Measure Library 220 may include an Acquire SEAM 221, a Sense SEAM 223, and a Decode SEAM 222. The Acquire SEAM 221 functionality may provide a primary path for the input of data into a computing node (120'-160') through a customized adapter 325 (See, FIG. 3) which embodies external callable interfaces. The customized adapter 325 pushes blocks of data into an Acquire SEAM 221, which then parses the data block and queues it for subsequent processing by another executable application (222-264).

The Sense SEAM 223 may provide a secondary path for the input of data into a computing node (120'-160') through a system initiated request to read data from a physical I/O device (i.e. Serial data ports, Sensor I/O interfaces, etc.). The Sense SEAM 223, then parses the data block, and queues it for subsequent processing by another executable application (222-264).

The Decode SEAM 222 may take the data queued by the Acquire SEAM 221 or Sense SEAM 223 and translate the data into a useable form (i.e. symptoms and/or variables) that other executable applications can process. The Decode SEAM 222 may also fill a circular buffer 380 (See, FIGS. 11*a*-*c*) with the data blocks queued by an Acquire SEAM 221 to enable snapshot or data logging functions.

The Extract Library 230 may include an Evaluate SEAM 231, a Record SEAM 234, an Analyze SEAM 232, a Trend SEAM 233 and a record SEAM 234. The Evaluate SEAM 231 may perform a periodic assessment of state variables of the complex system to trigger data collection, set inhibit conditions and detect complex system events based on real-time or near real-time data.

The Record SEAM 234 may evaluate decoded symptoms and variables to determine when snapshot/data logger functions are to be executed. If a snapshot/data log function has been triggered, the Record SEAM 234 may create specific snapshot/data logs and send them to a dynamic data store (DDS) 350*b*. The DDS 350*b* is a data storage location in a configuration file 185. Snapshots may be triggered by another executable application (221-264) or by an external system (not shown).

The Analyze SEAM 232 may run one or more algorithms using the variable values and trend data that may have been assembled by the Trend SEAM 233 and subsequently stored in a dynamic data store (DDS) 350*b* to determine specific symptom states and/or provide estimates of unmeasured parameter values of interest.

The Interpret Library 240 may include an Allocate SEAM 241, a Diagnose SEAM 242, a Rank Seam 243, a Predict SEAM 244, A Consumption Monitoring SEAM 245, a Usage Monitoring SEAM 246, and a Summarize SEAM 247. The Allocate SEAM 241 may perform inhibit processing, cascade effect removal and time delay processing on a set of symptoms, and then allocate the symptoms to the appropriate fault condition(s) that is (are) specified for the monitored device or subsystem. The Allocate SEAM 241 may also update the state of each fault condition based on changes in the state of any particular symptom associated with a fault condition.

The Diagnose SEAM 242 may orchestrate interaction between a system user, monitored assets and diagnostic reasoning to reduce the number of ambiguous failure modes for a given active fault condition until a maintenance procedure is identified that will resolve the root cause of the fault condition.

The Rank SEAM 243 may rank order potential failure modes after diagnostic reasoning has been completed. The failure modes, related corrective actions (CA) and relevant test procedures associated with a particular active fault condition are ranked according to pre-defined criteria stored in a Static Data Store (SDS) 350*a*. A SDS is a static data storage location in a configuration file 185 containing a persistent software object that relates an event to a pre-defined response.

The Predict SEAM 244 may run prognostic algorithms on trending data stored in the DDS 350*b* in order to determine potential future failures that may occur and provide a predictive time estimate. The Predict SEAM may also be known as an FC State Evaluation SEAM.

The Consumption Monitoring SEAM 245 may monitor consumption indicators and/or may run prognostic algorithms on trending data stored in the DDS 350*b* that are configured to track the consumption of perishable/life-limited supply material in the complex system and then predict when resupply will be needed. The consumption monitoring functionality may be invoked by a workflow service module 310, which is a component functionality of an internal callable interface 300 and will be discussed further below.

The Usage Monitoring SEAM 246 may monitor trend data stored in the DDS 350*b* to track the usage of a monitored device or subsystem in order to estimate the need for preventative maintenance and other maintenance operations. The usage monitoring functionality may be invoked by the workflow service module 310, which is a component 261 functionality of the internal callable interface 300.

The Summarize SEAM 247 may fuse health data received from all subsystems monitored by an application layer and its subordinate layers (120-160) into a hierarchical set of asset status reports. Such reports may indicate physical or functional availability for use. The asset status reports may be displayed in a series of graphics or data trees on the GUI 170 that summarizes the hierarchical nature of the data in a manner that allows the user to drill down into the CBM layer by layer for more detail. The Summarize functionality may be invoked by the Workflow service module 310. This invocation may be triggered in response to an event that indicates that a diagnostic conclusion has been updated by another module of the plurality. The display of the asset status may be invoked by the user through the user interface.

The Act Library 250 may include a Schedule SEAM 251, a Coordinate SEAM 252, a Report SEAM 253, a Track SEAM 254, a Forecast SEAM 255 and a Log SEAM 256. The Schedule SEAM 251 schedules the optimal time in which required or recommended maintenance actions (MA) should be performed in accordance with predefined criteria. Data used to evaluate the timing include specified priorities and the availability of required assets such as maintenance personnel, parts, tools, specialized maintenance equipment and the device/subsystem itself. Schedule functionality may be invoked by the workflow service module 310.

The Coordinate SEAM 252 coordinates the execution of actions and the reporting of the results of those actions between application layers 120-160 and between layers and their monitored devices/subsystems. Exemplary, non-limiting actions include initiating a BIT or a snapshot function. Actions may be pushed into and results may be pulled out of the Coordinate SEAM 252 using a customized adapter 325*a-e* which embodies an external callable interface. The customized adapter 325*a-e* may be symmetric such that the same communications protocol may be used when communicating up the hierarchy as when communicating down the hierarchy.

The Report SEAM 253 may generate a specified data block to be sent to the next higher application in the hierarchy and/or to an external user. Report data may be pulled from the Report SEAM 253 by the customized adapter 325*a-e*. The Report SEAM 253 may generate data that includes a health status summary of the monitored asset.

The Track SEAM 254 may interact with the user to display actions for which the user is assigned and to allow work to be accomplished or reassigned.

The Forecast SEAM 255 may determine the need for materials, labor, facilities and other resources in order to support the optimization of logistic services. Forecast functionality may be invoked by the Workflow service module 310.

The Log SEAM 256 may maintain journals of selected data items and how the data items had been determined over a selected time period. Logging may be performed for any desired data item. Non-limiting examples include maintenance actions, reported faults, events and the like.

The Interact Library 260 may include a Render SEAM 262, a Respond SEAM 261, a Graph SEAM 263, and an Invoke SEAM 264. The Render SEAM 262 may construct reports, tabularized data, structured data and HTML pages for display, export or delivery to the user via a user interface 461 (See, FIG. 4).

The Respond SEAM 261 may render data for display to the user describing the overall health of the complex system and to support detailed views to allow "drill down" for display of summary evidence, recommended actions and dialogs. The rendering of display data may be initiated by the Workflow service module 310; but the data may be pulled from the Render SEAM 262 via the callable interface 300. The Respond SEAM 261 may also receive and process commands from the user then route the commands to the appropriate module in the appropriate node for execution and processing. The commands may be pushed into the Respond Module via the callable interface 300.

The Graph SEAM 263 may provide graphical data for use by the Render SEAM 262 in the user displays on GUI 170. The graphical data may include the static content of snapshot and trend files or may dynamically update the content of the data in the circular buffer.

The Invoke SEAM 264 may retrieve documents to be displayed to a user interface 461 via a maintainer node 150' or interacts with an external document server system (not shown) to cause externally managed documents to be imported and displayed.

To reiterate, each of the SEAMs (221-264) discussed above are never modified. The SEAMs (221-264) are loaded into any computing node (120'-160') of the hierarchical structure 200 and any number of SEAMs may be loaded into a single node. Once installed, each standard executable application module (221-264) may be initialized, directed and redirected by a user by changing the configuration data 180 resident in the database 190 to perform specific tasks in regard to its host computing device or platform.

Communication between SEAMs (221-264) within a node is facilitated by a callable interface 300. A callable interface 300 is resident in each computing node (120'-160') of the hierarchical structure 200. The callable interface 300 may have several sub-modules (302-310) that may be co-resident in a single computing device of a computing node (120'-160'). Exemplary sub-modules of the callable interface 300 may include a framework executive 301 as a component of the callable interface 300, a workflow service module 310, an error reporting server 302, a debugging server 303, a framework data accessor, a run-time shared data manager 305 and common utilities 306. Those of ordinary skill in the art will recognize that in equivalent embodiments a "module," "a sub-module," "a server," or "a service" may comprise software, hardware, firmware or a combination thereof.

The framework executive 301 of a computing node provides functions that integrate the nodes within the hierarchical structure 200. The framework executive 301 in conjunction with the configuration files 185 coordinate initialization of each node including the SEAMs (221-264) and the other service modules 301-310 allowing the execution of functions that are not triggered by a customized adapter 325 (discussed further below). In some embodiments, the computing nodes in all application layers may have a framework executive 301. In other embodiments, nodes in most application layers except, for example, an EHM Layer 120 will have a framework executive 301. In such embodiments, the computing nodes 120' in the EHM layer 120 may rely on its host platform (i.e. computing device) operating software to perform the functions of the framework executive.

Error reporting services 302 provide functions for reporting run-time errors in a node (120-160) within the hierarchical structure 200. The error reporting server 302 converts application errors into symptoms that are then processed as any other failure symptom, reports application errors to a debugging server 303 and reports application errors to a persistent data manager (not shown).

Debugging services 303 collects and reports debugging status of an executable application module (221-264) during testing, integration, certification, or advanced maintenance services. This server may allow the user to set values for variables in the DDS 350b and to assert workflow events.

The framework data accessor 304 provides read access to the SDS 350a and read/write access to the DDS 350b (each stored in a memory 190) by the SEAMs (221-264) in a computing node (120'-160'). Write access to the SDS 350a is accomplished via the data modeling tool 171, which includes GUI 170.

The run-time shared data manager 305 manages all node in-memory run-time perishable data structures that are shared between SEAMs (221-264) that are not stored in the DDS 350b, but does not include cached static data. As non-limiting examples of perishable data structures may include I/O queues and circular buffers.

Common utilities 306 may include common message encoding/decoding, time-stamping and expression evaluation functions for use by the SEAMs (221-264) installed in a computing node.

The work flow service module 310 is a standard set of logic instructions that enable a data-driven flow of tasks within a computing node to be executed by the various SEAMs (221-264) within the node. The workflow service module 310 acts as a communication control point within the computing node where all communications related to program execution to or from one executable application module (221-264) are directed through the node's workflow service module 310. Stated differently, the workflow service module 310 of a node (120'-160') orchestrates the work flow sequence among the various SEAMs (221-264) that happen to reside in the node. In some embodiments the workflow service module 310 may be a state machine.

Figure 3:
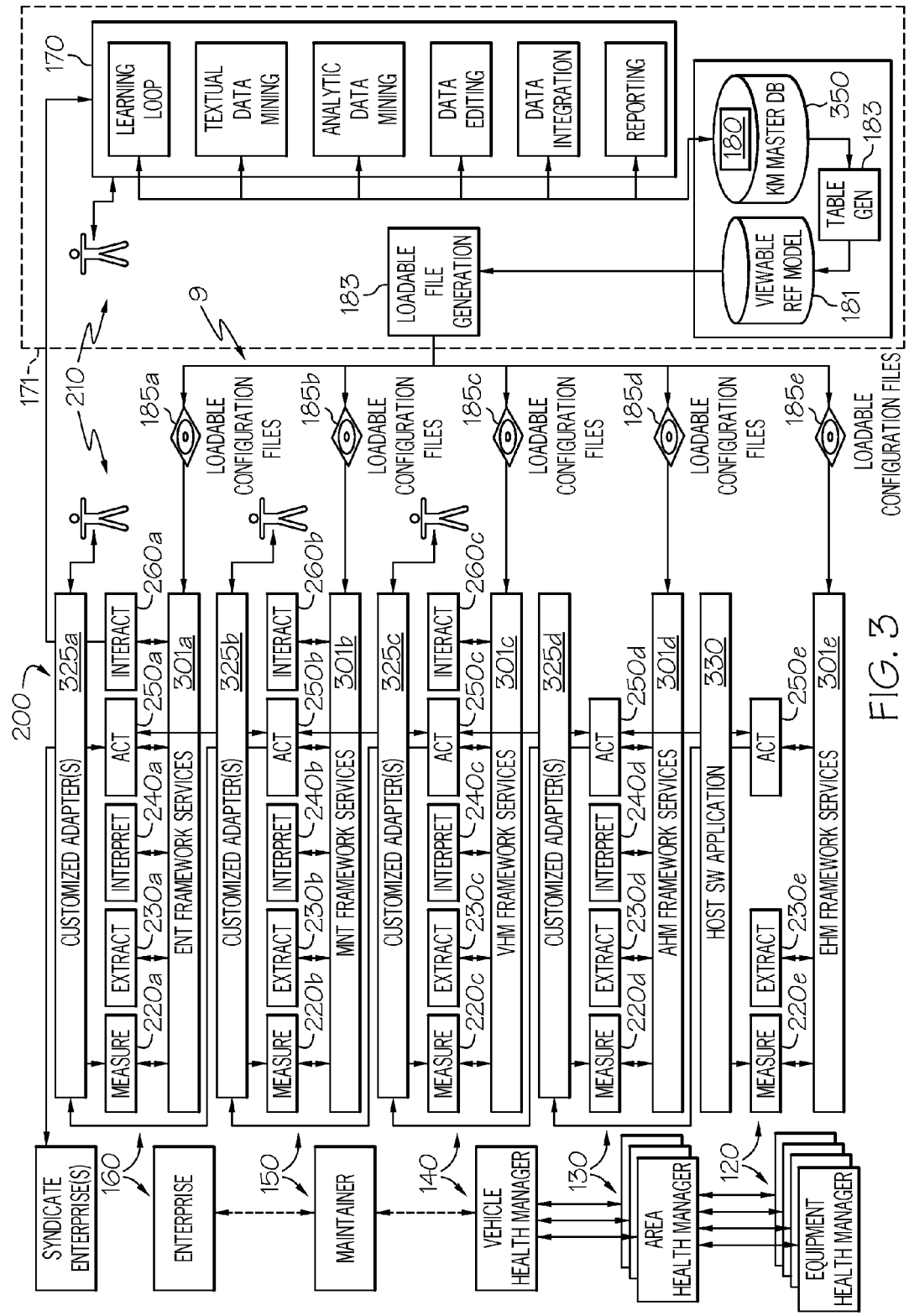
FIG. 3 is a simplified schematic of an exemplary reconfigurable system to optimize run time performance of a hierarchical condition based maintenance system.

FIG. 3 is a simplified, exemplary schematic of a configured hierarchical structure 200 that may optimize the run time performance of the hierarchical structure 200. The exemplary embodiment of FIG. 3 features a hierarchical structure 200 comprising five exemplary hierarchical layers (120-160), although in other embodiments the number of hierarchical layers may range from a single layer to any number of layers. Each hierarchical layer (120-160) includes one or more nodes (120'-160') containing SEAMs (221-264) that were copied and loaded from one of the reusable libraries (220-260) into a computing node (120'-160') in the layer. Each SEAM (221-264) may be configured by a user 210 by modifying its respective loadable configuration file 185. The loadable configuration file 185 is constructed using the data driven modeling tool 171.

For the sake of simplicity, the SEAMs (221-264) may be discussed below in terms of their respective libraries. The number of combinations and permutations of executable applications (221-264) is large and renders a discussion using specific SEAMs unnecessarily cumbersome.

At an EHM layer 120, there may be a number of EHM nodes 120', each being operated by a particular host computing device that is coupled to one or more sensors and/or actuators (not shown) of a particular component of the complex system. As a non-limiting example, the component of the complex system may be a roller bearing that is monitored by a temperature sensor, a vibration sensor, a built-in-test, sensor and a tachometer, each sensor being communicatively coupled to the computing device (i.e. a node). As a non-limiting example, the host computing device of an EHM node 120' of the complex system may be a computer driven component area manager ("CAM") (i.e. a node). For a non-limiting example of a CAM that may be suitable for use as EHM nodes, see co-owned, co-pending U.S. patent application Ser. No. 12/493,750.

Each host EHM computing device 120' in this example is operated by a host software application 330. The host executive software 330 may be a proprietary program, a custom designed program or an off-the-shelf program. In addition to operating the host device, the host software application also may support any and all of the SEAMs (221-264) via the framework services 301 by acting as a communication interface means between EHM nodes 120' and between EHM nodes 120' and other nodes located in the higher levels.

The exemplary embodiment of FIG. 3 illustrates that the host executive software 330 of an EHM node 120' may host (i.e. cooperate) one or more SEAMs 220e from the Measure Library 220, one or more SEAMs 230e from the Extract Library 230 and one or more SEAMs 250e from the Act Library 250. The SEAMs 220e, 230e, and 250e are identical to their counterpart application modules that may reside in any another node in any other level in the hierarchical structure 200. Only when directed by the configuration file 185e, will a SEAM(s) (221-264) differ in performance from its counterpart module that has been configured for and is a resident in another node in the hierarchical structure 200. Once configured/directed, a standardized executable application (221-264) becomes a special purpose executable application module.

At an AHM layer 130, there may be a number of AHM nodes 130'. Each AHM node is associated with a particular host computing device that may be coupled to one or more sensors and/or actuators of a particular component(s) or a subsystem of the complex system and are in operable communication with other AHM nodes 130', with various EHM nodes 120' and with higher level nodes (e.g., see 501, 502, 601 and 602 in FIGS. 5-6). As a non-limiting example, the host computing device of an AHM of the complex system may be a computer driven sub-system area manager ("SAM") (i.e. a node) operating under its own operating system (not shown). For non-limiting examples of a SAM that may be suitable for use as an AHM node, see co-owned, co-pending patent application Ser. No. 12/493,750.

The exemplary AHM node 130' of FIG. 3 illustrates that the AHM node 130' has an additional interpret functionality 240d that in this example has not been configured into the EHM node 120'. This is not to say that the EHM node 120' cannot accept or execute a function from the Interpret library 240, but that the system user 210 has chosen not to populate the EHM node 120' with that general functionality. On the other hand, the AHM node 130' software hosts one or more SEAMs 220d from the Measure Library 220, one or more SEAMs 230d from the Extract Library 230 and one or more SEAMs 250d from the Act Library 250. In their unconfigured or undirected state, the SEAMs 220d, 230d, and 250d are identical to their counterpart application modules that may reside in any another node in any other level in the hierarchical structure 200.

Unlike the exemplary EHM node 120', the exemplary AHM node 130' may include a different communication interface means such as the customized adapter 325d. A customized adapter 325 is a set of services, run-time software, hardware and software tools that are not associated with any of the SEAMs (221-264). The customized adapters 325 are configured to bridge any communication or implementation gap between the hierarchical CBM system software and the computing device operating software, such as the host application software 410 (See, FIG. 4). Each computing node (120'-160') may be operated by its own operating system, which is its host application software. For the sake of clarity, FIG. 3 shows only the host executive software 330 for the EHM node 120'. However, host application software exists in all computing nodes (120'-160').

In particular the customized adapters 325 provide symmetric communication interfaces (e.g., communication protocols) between computing nodes and between computing nodes of different levels. The customized adapter 325a-d allow for the use of a common communication protocol throughout the hierarchical structure 200 from the lowest EHM layer 120 to the highest enterprise layer 160 as well as with the memory 190.

At a VHM layer 140, there may be a number of VHM nodes 140', each VHM node is associated with a particular host computing device that may be in operative communication with one or more sensors and/or actuators of a particular component(s) of the complex system via an EHM node 120' or to subsystems of the complex system and that are in operable communication via their respective AHM nodes 130'. As a non-limiting example, the VHM node 140' may be a computer driven system level control manager ("SLCM") (i.e. also a node). For non-limiting examples of a SLCM that may be suitable for use as a VHM node, see co-owned, co-pending patent application Ser. No. 12/493,750.

In the exemplary hierarchical structure 200 there may be only one VHM node 140', which may be associated with any number of AHM node 130' and EHM node 120' nodes monitoring a sub-systems of the complex system. In other embodiments, there may more than one VHM node 140' resident within the complex system. As a non-limiting example, the complex system may be a fleet of trucks with one VHM node 140' in each truck that communicates with several EHMs 120' and with several AHM nodes 130' in each truck. Each group of EHM nodes 120' and AHM nodes 130' in a truck may also be disposed in a hierarchical structure 200.

FIG. 3 further illustrates that the exemplary VHM node 140' has an additional Interact functionality 260c that has not been loaded into the EHM node 120' or into the AHM node 130'. This is not to say that these lower level nodes cannot accept or execute an Interact function 260, but that the system user 210 has chosen not to populate the lower level nodes with that functionality. On the other hand, for example, the host software of VHM node 140' hosts one or more SEAMs 220c from the Measure Library 220, one or more SEAMs 230c from the Extract Library 230, one or more SEAMs 240c from the Interpret Library 240 and one or more SEAMs 250c from the Act Library 250. The executable applications from the Interact library allow the system user 210 to access the VHM node 140' directly and to view the direction thereof via the GUI 170. In their undirected state, the SEAMs 220c, 230c, 240c and 250c are identical to their counterpart application modules that may reside in any another node in any other level in the hierarchical structure 200. The standardized executable applications 220c-260c are directed to carry out specific functions via configuration files 185c.

Like the exemplary AHM node 130', an exemplary VHM node 140' includes a customized adapter 325c. The customized adapter 325c is also configured to bridge any communication or implementation gap between the hierarchical system software and the computing device operating software operating within VHM node 140'.

At the Maintainer (MNT) layer 150, there may be a number of MNT nodes 150', each MNT node is associated with a particular host computing device that may be in operative communication with one or more sensors and/or actuators of a particular component(s) of the complex system via an EHM node 120', in operative communication with one or more subsystems of the complex system and that are in operable communication via their respective AHM node 130', and to the VHM nodes 140'. As a non-limiting example, the MNT node 150' may be a laptop computer in wired or wireless communication with the communication system 9 of the hierarchical structure 200. Conversely, the MNT node 150' may be a stand alone computing device in a fixed location within the hierarchical structure 200.

FIG. 3 illustrates that the exemplary MNT node 150' may have the functionality of some or all of the executable applications (221-264). This is not to say that these lower level nodes cannot accept or execute any of the SEAMS (221-264), but that the system user 210 has chosen not to populate the lower level nodes with that functionality. Like the exemplary VHM node 140' the SEAM 260b from the Interact library allow the system user 210 to access the Maintainer node 150' directly and may view the direction thereof via the GUI 170. In their undirected state, the SEAMs 220b, 230b, 240b and 250b are identical to their standard counterpart application modules that may reside in any another node in any other level in the hierarchical structure 200. The SEAMs 220b-260b are directed to carry out specific functions via configuration files 185b.

Like the exemplary AHM node 130' and VHM node 140', the MNT node 150' includes a customized adapter 325b. The customized adapter is configured to bridge any communication implementation gap between the hierarchical system software and the computing device operating software operating within the various nodes of the hierarchical structure 200.

At the Enterprise (ENT) layer 160, there may be a number of ENT nodes 160', each ENT node is associated with a particular host computing device that may be in operative communication with one or more sensors and/or actuators of a particular component(s) of the complex system via an EHM node 120', to subsystems of the complex system and that are in operable communication via their respective AHM node 130' and the VHM nodes 140', as well the MNT nodes 150'. As a non-limiting example, the ENT node 160' may be a general purpose computer that is in wired or wireless communication with the communication system 9 of the hierarchical structure 200.

FIG. 3 also illustrates that the ENT node 160' may have the functionality of some or all of the executable applications (221-264) as selected and configured by the user. Like the exemplary VHM node 140', the executable application(s) 260a from the Interact library allow the system user 210 to access the ENT node 160' node directly via the GUI 170. In their undirected state, the SEAMs 220a, 230a, 240a and 250a are identical to their undirected counterpart application modules (221-264) that may reside in any another node in any other level in the hierarchical structure 200. The executable applications 220a-260a are configured/directed to carry out specific functions via configuration files 185a.

Like the exemplary AHM node 130', VHM node 140' and the MNT node 150', the ENT node 160' includes a customized adapter 325a. The customized adapter 325a is also configured to bridge any communication or implementation gap between the hierarchical system software and the host computing device software operating within the ENT node.

In various embodiments, none of the computing nodes (120'-160') are able to communicate directly with one another. Hence, all computing nodes (120'-160') communicate via the customized adapters 325. In other embodiments, most computing nodes 120'-160' may communicate via the customized adapters 325. For example, an exception may be an EHM node 120', which may communicate via its host executive software 330.

A customized adapter 325 is a component of the host executive software 330 and is controlled by that host software. The customized adapter 325 provides an interface between the host executive software 330 and the SEAMs (221-264). The workflow service module 310 will invoke one or more of the SEAMs (221-264) and services (302, 303, 306) to make data available to the customized adapter 325, which places data from a node onto a data bus of the communication system 9 and pulls data from the bus for use by one of the SEAMs (221-264). For example, the Acquire SEAM 221 may receive data from the customized adapter 325, or the Report SEAM 253 may produce data to be placed on the bus by the customized adapter.

The communication system 9 may be any suitable wired or wireless communications means known in the art or that may be developed in the future. Exemplary, non-limiting communications means includes a CANbus, an Ethernet bus, a firewire bus, spacewire bus, an intranet, the Internet, a cellular telephone network, a packet switched telephone network, and the like.

The use of a universal input/output front end interface (not shown) may be included in each computing node (120'-160') as a customized adapter 325 or in addition to a customized adapter 325. The use of a universal input/output (I/O) front end interface makes each node behind the interface agnostic to the communications system by which it is communicating. Examples of universal I/O interfaces may be found in co-owned application Ser. Nos. 12/750,341 and 12/768,448, and are examples of communication interface means.

The various computing nodes (120'-160') of the hierarchical structure 200 may be populated using a number of methods known in the art, the discussion of which is outside the scope of this disclosure. However, exemplary methods include transferring and installing the pre-identified, pre-selected SEAMs to one or more data loaders of the complex system via a disk or other memory device such as a flash drive. Other methods include downloading and installing the SEAMs directly from a remote computer over a wired or wireless network using the complex system model 181, the table generator 183 and the GUI 170. In regard to MNT nodes 150', MNT nodes may be alternatively populated offline to the extent that they are hosted in portable computing devices.

The data modeling tool 171, table generator 183 and the GUI 170 may be driven by, or be a subsystem of any suitable HMS computer system known in the art. A non-limiting example of such an HMS system is the Knowledge Maintenance System used by Honeywell International of Morristown N.J. and is a non-limiting example of a model based configuration means. The data modeling tool 171 allows a subject matter expert to model their hierarchical structure 200 as to inputs, outputs, interfaces, errors, etc. The table generator 283 then condenses the system model information into a compact dataset that at runtime configures or directs the functionality of the various SEAMs (221-264) of hierarchical structure 200.

The GUI 170 renders a number of control screens to the system user 210. The control screens are generated by the HMS system or by a maintainer computing device 150' and provide an interface for the system user 210 to configure each SEAM (221-264) to perform specific monitoring, interpretation and reporting functions associated with the complex system.

FIG. 4 is a simplified functional block diagram of a maintainer node 150'. As with all nodes (120'-160'), the various components of the node software (e.g., SEAMs, SDS, DDS, workflow service) exist co-operationally with the host operating system 330. Thus, the maintainer node 150' includes configured SEAMS (e.g., Respond 261). Because a MNT node 150' is high up in the hierarchical system such that it is capable of providing user interface capability, MNT node 150' may include an entire SEAM library (220-260) that has been configured. However, a MNT node 150' is differentiated from a lower level node (120-140') because a MNT node 150' is populated with the SEAMs from the Interpret Library 240 and the Interact library 260.

Whether permanently embedded in hierarchical system or removably attached, a MNT node 150' provides user interface capability that allows a user to retrieve relevant information about the hierarchical system 200 and, by extension, the complex system that is being monitored. For example the Respond SEAM 261 is configured to handle requests and responses invoked via a user interface 460. The user interface 460 may be a web page 461 rendered by a web browser 461. The requests and responses are processed by a user interface web application 431 executing on a web server 430. Normal web functions such data processing and image rendering are not included in the SEAM libraries (220-260) due to their relative complexity and to prevent over burdening SEAM functionality where such functionality may be more efficiently housed elsewhere.

In cases with removable (i.e., non-embedded) MNT nodes 150', a relational database mat be used to host the configuration file 185, which includes the SDS 350a and DDS 350b. When embedded, the SDS 350a and DDS 350b may be hosted in a binary configured database due to relative through put and memory space limitations.

Figure 5:
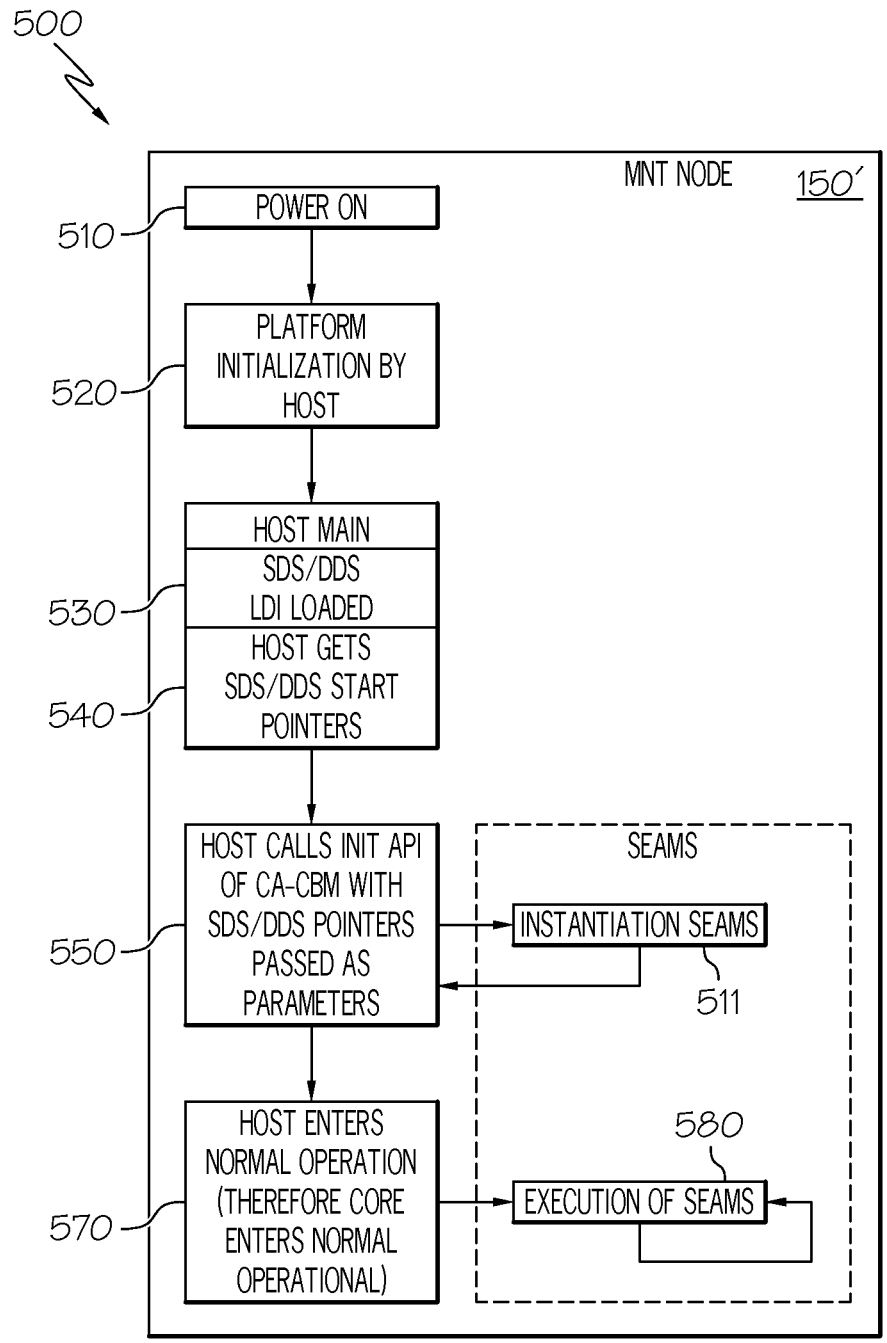
FIG. 5 is a simplified exemplary logic flow diagram of the initialization process of a maintainer node host application.

FIG. 5 is a flow diagram for a method 500 initializing an MNT Node 150'. At process 510 the MNT Node 150' is powered on. At process 520, the computing device (e.g., a lap top computer) hosting the MNT Node is initialized by the host executive 330. At process 530, a configuration file 185 including the workflow service 310 and the appropriate SDS 350a and DDS 350b are received and loaded at the host via either the web server 430 (see, FIG. 4) or the communication system 9 (see, FIG. 2). At process 540, the host receives start data pointers for the SDS 350a and the DDS 350b. At process 550, the host calls an initialize application programming interface (API) as may be known in the art and passes the SDS and DDS pointers as parameters to the SEAMs (220-260) loaded and resident in the MNT Node 150'. At process 570, the host executive 330 enters normal operation as do the SEAMs (220-260) and workflow service 310.

Figure 6:
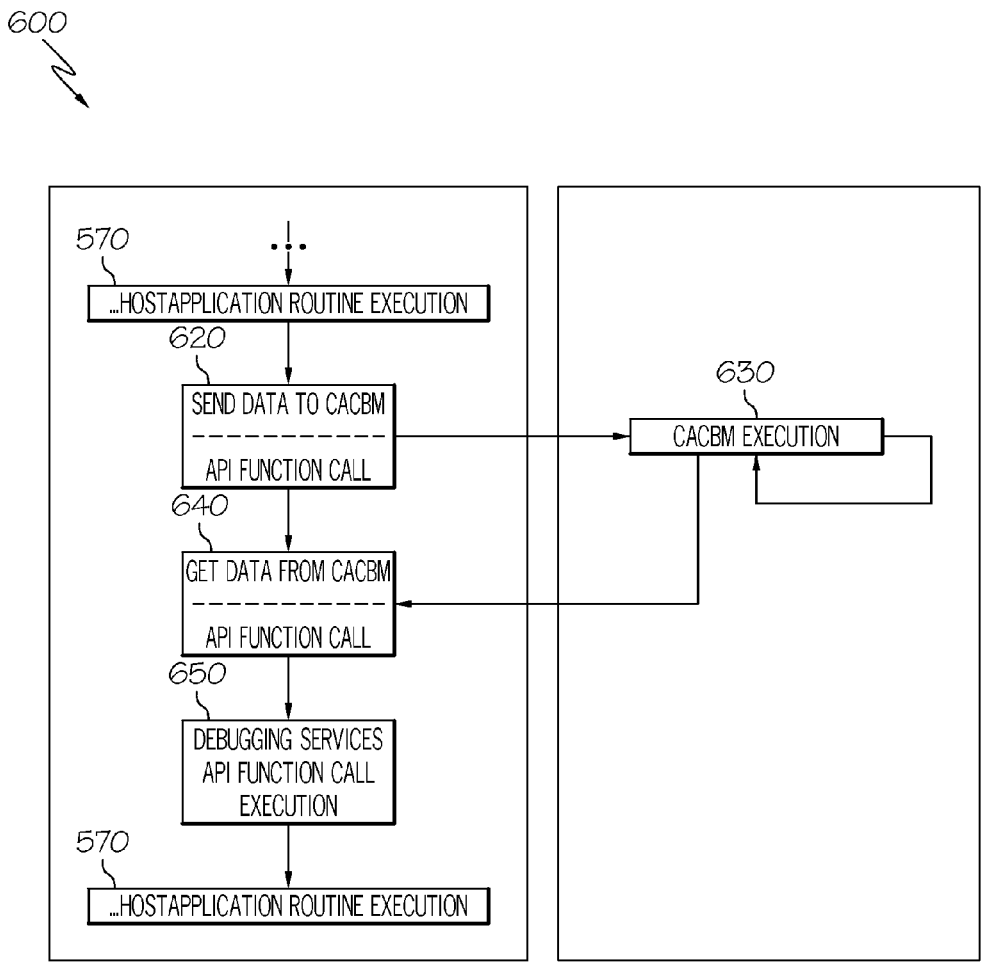
FIG. 6 is an exemplary logic flow diagram for the execution of a SEAM in a host application.

FIG. 6 is a simplified functional flow diagram for a method 600 for sending requests to the SEAMs (220-260) of the MNT Node and receiving data back. Specific SEAMs used primarily by the MNT Nodes 150' and ENT Nodes 160' include those found in the Interact library 260 and the interpret library 240. SEAMs in the interact library 260 are only used for user interface data exchange. Method 600 is a low priority set of instructions as viewed by the host executive 330 such that the host executive may interrupt the method to perform high level requirements such as receiving data from sensors and external busses (e.g., communication system 9), retrieving processed data from other nodes in the hierarchical system 200, and other functions such as debugging and trouble shooting.

In operation, the user connects to the user interface web application 431 via the via a web browser 461 and requests certain data from the hierarchical system. The user web application 431, in turn, requests all data that is required to handle the user request from the configured SEAMs (220-260) in the MNT Node 150' using method 600 (See, FIG. 6)

In FIG. 6, the method begins at process 570 (See, FIG. 5) where the host application 330 is undergoing routine application. A process a message/command thread is begun. A process 620 an API function call is made to the appropriate SEAMS (220-260) resident in the tenant node (120-160) along with whatever data (i.e. messages, events) need to be sent. At process 630, the appropriate SEAMS resident in the tenant node work on the data (See, e.g., Application Ser. Nos. 13/016,601 and 13/077,276 herein incorporated by reference in their entirety). At process 640, the Host application 330 retrieves the expected result from the tenant node by making another API function call. At process 650, the debugging utility 303 (See, FIG. 2) services the function call execution and the Host application 330 returns to normal operation 570.

The Respond SEAM 261 is particularly designed to facilitate such functionality. The user web application 431 receives the requested data (e.g., XML format) from the hierarchical system 200 via the SEAMs (220-260) of the MNT Node 150', will add graphical information and return web pages populated with the requested data to the user via the browser 460.

Figure 7:
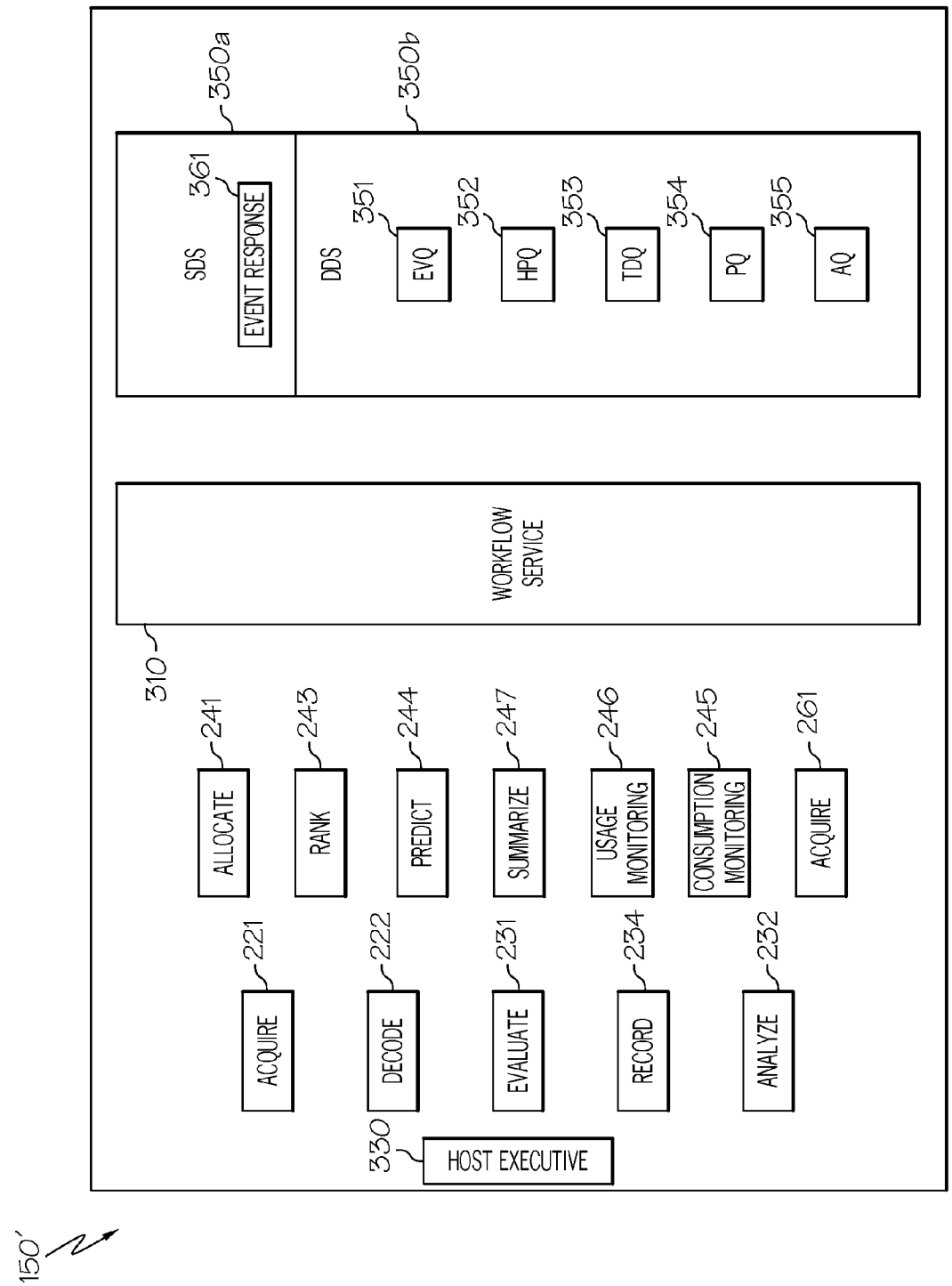
FIG. 7 is a simplified exemplary block diagram of an exemplary computing node illustrating it components.
Figure 8:
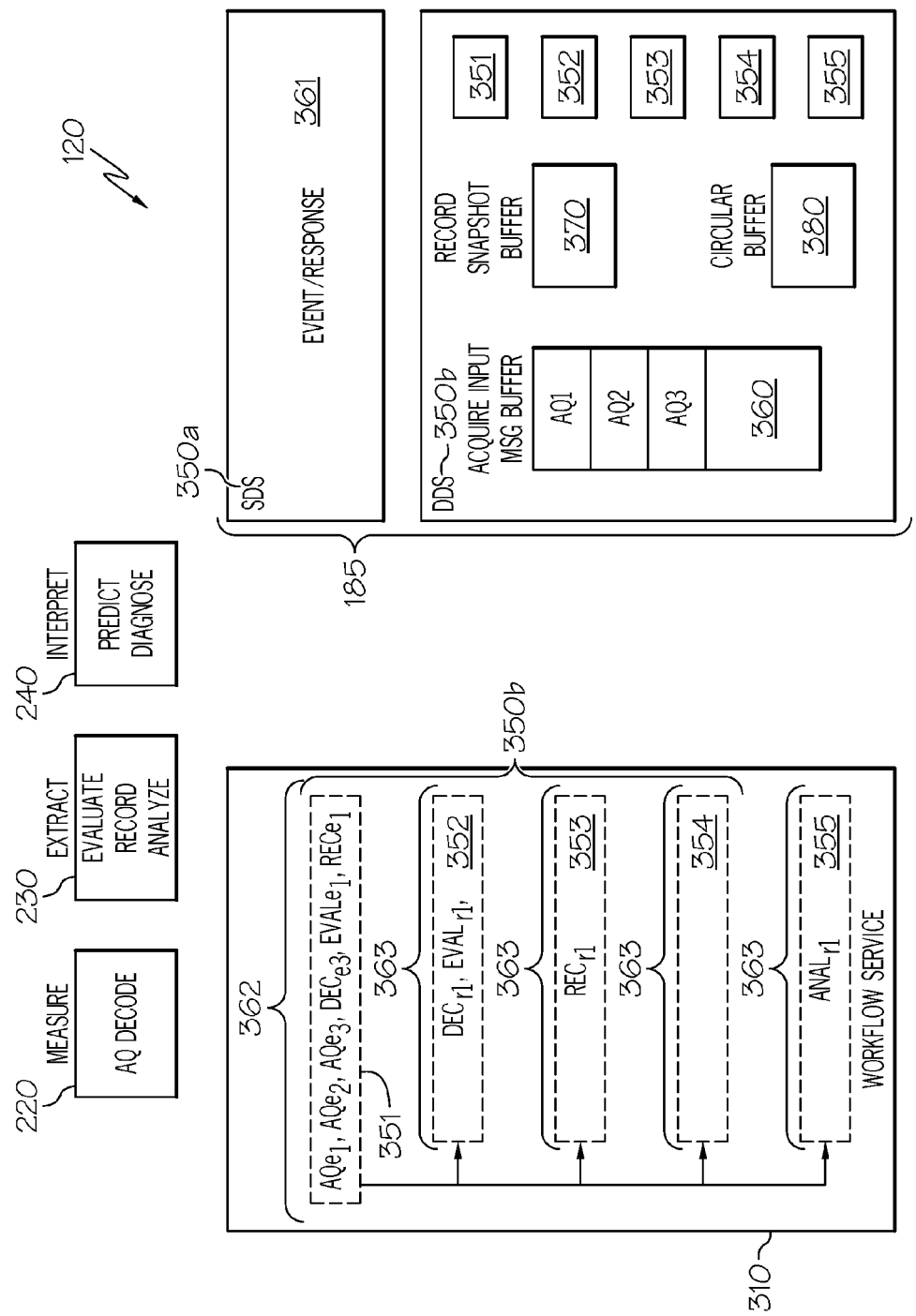
FIG. 8 is an simplified block diagram of an exemplary lower level computing node SDS, DDS and workflow service with an exemplary event flow stream.

FIGS. 7 and 8 are simplified block diagrams of an exemplary computing node (120'-160'). Each computing node (120'-160') utilizes its own host executive software 330. The host executive software 330 executes the normal operating functions of the host MNT 150', but may also provide a platform for hosting additional health maintenance functions residing in any SEAM (221-264) populating the computing node as described above. As described above, there are 24 SEAMs (221-264) disclosed herein. However, other SEAMs with additional functionalities may be included. As such, any discussion herein is intended to extend to any SEAMs that may be created in the future.

In the interest of brevity and clarity of the following discussion, the number of SEAMs (221-264) in the following example has been limited. The operation of a lower level computing node such as an EHM node 120', an AHM node 130', and an VHM node 140' utilizes the same basic SEAMS as an MNT node to accomplish basic data processing tasks such as, but not limited to an Acquire SEAM 221, a Decode SEAM 222, Evaluate SEAM 231, a Record SEAM 234 and an Analyze SEAM 232 as these SEAMs may be viewed as providing some basic functionality common to each SEAM resident in each computing node (120'-160') of the hierarchy, but will be extended to other SEAMs in regards to FIGS. 9a-9c.

In addition to the SEAMs (221-264), each computing node (120'-160') also includes a configuration file 185 and a workflow service module 310. The configuration file 185 comprises the DDS 350b and the SDS 350a. Among other data structures, the DDS 350b may comprise an Event Queue (EVQ) 351, a High Priority Queue (HPQ) 352, a Time Delayed Queue (TDQ) 353, a Periodic Queue (PQ) 354 and an Asynchronous Queue (AQ) 355. However, it will be appreciated by those of ordinary skill in the art that the number of queues, their categorization and their priority may be defined and redefined to meet the requirements of a particular application. For Example, the EVQ 351 may be divided into three or more sub-queues such as an Acquire Event Queue, a Coordinate Event Queue and a User Interface Event Queue. Providing separate sub-event queues resolves any concurrent write issues that may arise.

Referring to FIG. 8, the DDS 350b may also include at least one message buffer 360 for each SEAM (221-264) that has been populated into the MNT node 150'. However, in some embodiments only SEAMs within the Measure Library may have a message buffer. The DDS 350b may also include a number of record snapshot buffers 370 and circular buffers 380 that store particular dynamic data values obtained from the complex system to be used by the various SEAMs (221-264) for various computations as provided for by the configuration file 185. The data stored in each of the message buffers 360, snapshot buffers 370 and circular buffers 380 is accessed using a data accessor 304 which may be any suitable data accessor software object known in the art. The particular data structure and the location in the DDS 350b for the message buffers 360, circular buffers 380 and snapshot buffers 370, are predetermined and are established in a memory device at run time.

The SDS 350a is a persistent software object that may be manifested or defined as one or more state machines 361 that map a particular event 362 being read by the workflow service module 310 from the Event Queue (EVQ) 351 to a particular response record 363 (i.e., an event/response relationship). The state machine 361 then assigns a response queue (352-355) into which the response record 363 is to be placed by the workflow service module 310 for eventual reading and execution by the workflow service module 310. The structure and the location of the persistent data in the SDS 350a is predetermined and is established in a memory device at run time.

The exemplary events 362 may be received into the EVQ 351 in response to a message from an outside source that is handled by the customized adapter 325 of the computing node (120'-160'), as directed by the host executive software 330. Events 362 may also be received from any of the populated SEAMs (221-264) resident in the computing node (120'-160') as they complete a task and produce an event 362.

In the more basic SEAMs such as Sense 223, Acquire 221, Decode 222 and Evaluate 231, the event/response relationships stored within the SDS 350a do not tend to branch or otherwise contain significant conditional logic. As such, the flow of events 362 and response records 363 is relatively straight forward. However, more sophisticated SEAMs such as Coordinate 252, Forecast 255 and Respond 261 may utilize sophisticated algorithms that lead to complicated message/response flows associated with an MNT node and an ENT node.

As an operational example of a lower level node, the host executive software 330 may push an input message into an EHM node 120' that is received from an outside source. The host executive software 330 calls a customized adapter 325 which in turn calls the appropriate SEAM (221-264) resident in the EHM node 120' based on data included in the message. For Example, the called SEAM may be the Acquire SEAM 221. When called, the Acquire SEAM 221 places the input message into a message buffer 360 (e.g., the Acquire input message buffer), generates an event 362 and places the event into the EVQ 351. The event 362 may contain data about the complex system from another node or from a local sensor. In the interest of simplicity and clarity of explanation, this first event 362 will be assumed to be an "acquire data" message and the event 362 generated from the input message will be referred to herein as $AQe_1$. In other embodiments the input message $AQ_1$ may be generated by another SEAM (221-264) and the event $AQ_{e1}$ pushed into the EVQ 351 by the SEAM.

Once the input message $AQ_1$ is placed in a message queue 360 and its corresponding event 362 is placed into the EVQ 351, then the Acquire SEAM 221 exits and returns control to the workflow service module 310 via return message 364. In this simple example, only a single processor processing a single command thread is assumed. Thus, while the processor is executing a particular SEAM (221-264), the workflow service module 310 and no other SEAMs are operating. Similarly, while the workflow service module 310 is being operated by the processor, no SEAMS (221-264) are in operation. This is because all steps in the operation are performed sequentially. However, in other embodiments, multiple processors may be used, thereby permitting multiple threads (i.e., multiple workflow service modules 310) to be operated in parallel using the same populated set of SEAMs (221-264) and the same configuration file 185.

Upon receiving the return message 364 (See, FIG. 12), the workflow service module 310 resumes operation and reads event $AQ_{e1}$ first in this example because event $AQ_{e1}$ is the first event 362 in the EVQ 351. This is so because the EVQ 351 is the highest priority queue and because the workflow service module 310 may read events sequentially in a first-in-first-out (FIFO) manner. Therefore those of ordinary skill in the art will appreciate that any subsequent events stored in the EVQ 351 would be read in turn by the workflow server on FIFO basis. However, reading events in a FIFO manner is merely exemplary. In equivalent embodiments, the workflow service module may be configured to read events in some other ordinal or prioritized manner.

Once event $AQ_{e1}$ is read, the workflow service module 310 consults the persistent data structures in the SDS 350a to determine the required response record 363 to the event $AQ_{e1}$. The response record 363 provided by the SDS 350a may, for example, be a decode response record $DEC_{r1}$ that directs the Decode SEAM 222 to process the data received from the input message $AQ_1$, which is now stored in a storage location in the DDS 350b. The SDS 350a also directs the workflow service module 310 to place the response record $DEC_{r1}$ into one of the response queues 352-355, such as HPQ 352, and assigns the location in the response queue in which to place the response based on an assigned priority. The SDS 350a may determine the appropriate queue and its priority location in the queue based on the input message type, the data in the input message and on other data such as a priority data field. The workflow service module 310 places the response record $DEC_{r1}$ into the HPQ 352 at the proper prioritized location and returns to read the next event in the EVQ 351.

Because the EVQ 351 is the highest priority event/response queue, the workflow service module 310 continues reading events 362 and posts responses records 363 until the EVQ is empty. When the EVQ 351 is empty, the workflow service module 310 begins working on response records 363 beginning with the highest priority response queue (352-355), which in this example is the HPQ 352.

The first prioritized response record in HPQ 352 in this example is the $DEC_{r1}$ response (i.e., a Decode response). When read, the workflow service module 310 calls (via call 365) a response handler interface of the Decode SEAM 222 for the Decode SEAM to operate on the data referenced in the $DEC_{r1}$ response record 363.

After being called by the workflow service module 310, the Decode SEAM 222 consults the SDS 350a with the response record $DEC_{r1}$ to determine what operation it should perform on the data associated with $DEC_{r1}$ and performs it. As disclosed above, a SDS 350a maps the event $DEC_{r1}$ to a predefined response record 363 based on the message type and the data referenced within $DEC_{r1}$. Data associated with event $DEC_{r1}$ may reside in any of the record snapshot buffers 370, circular buffers 380, or the data may have to be queried for from a source located outside the exemplary node.

The Decode SEAM 222 operates on the data and generates an event 362 and places the event into the EVQ 351 and a message into the message queue 360. For example, the response record 363 generated by the Decode SEAM 222 may be $EVAL_{e1}$ indicating that the next process is to be performed by the Evaluate SEAM 231. The Decode SEAM 222 then exits and sends a return message 364 back to the workflow service module 310 to resume its operation. The process begins anew with the workflow service module 310 reading the EVQ 351 because there are now new events (including $EVAL_{e1}$) that have been added to the queue.

In the normal course, the work flow service module 310 eventually reads event $EVAL_{e1}$ and consults the SDS 350a to determine the proper response record 363 and which response queue to place it in and in what priority within the response queue. In this example the response $EVAL_{r1}$ is also place in the HPQ 352 and is in first priority because the response record $DEC_{r1}$ would have already been operated on and dropped out of the queue. The workflow service then reads the next event from the EVQ 351, and the process continues.

Figure 9:
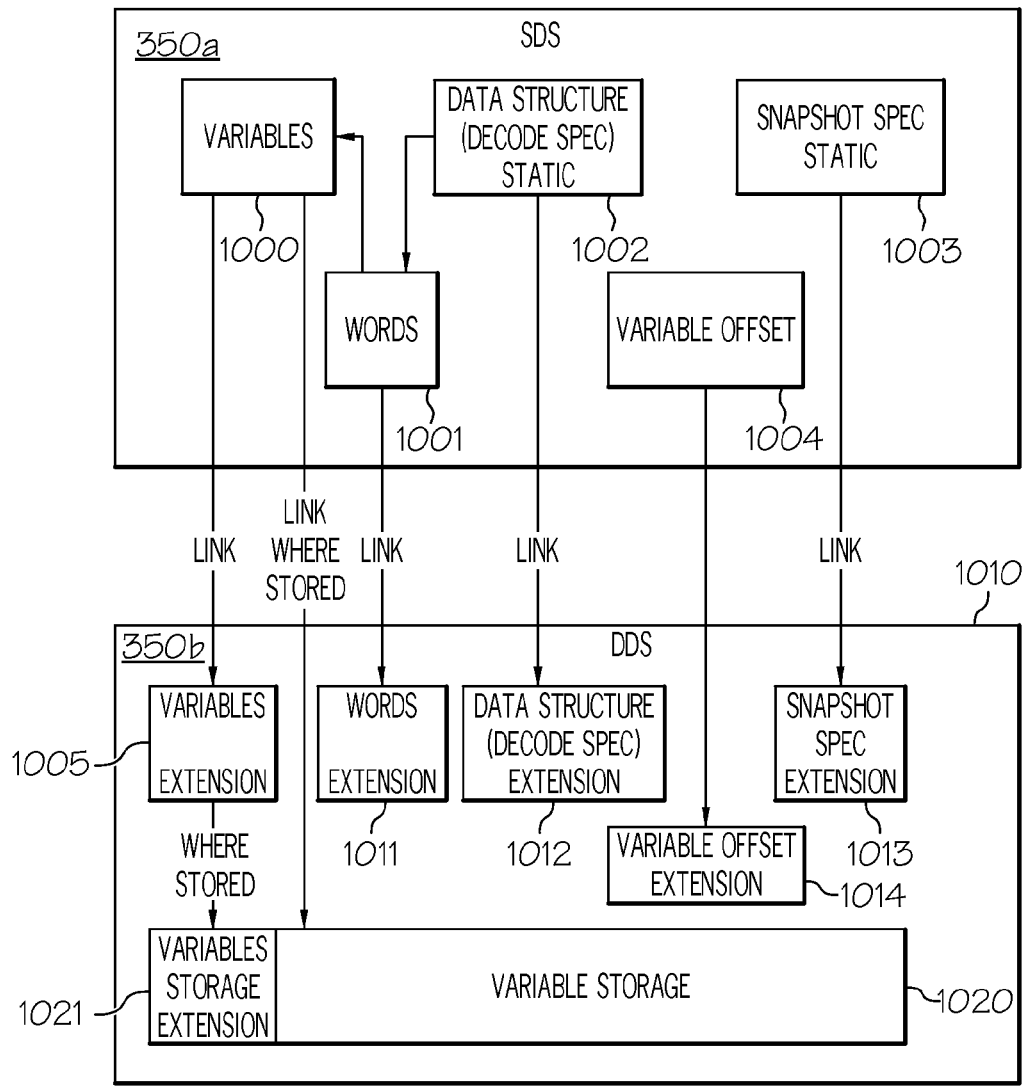
FIG. 9 is a simplified block diagram of an exemplary computing node SDS and its extension into an associated DDS.

FIG. 9 is a simplified functional depiction of a modified SDS 350a and a DDS 350b as may exist in a MNT note 150'. In the SDS 350a there exists variables specification 1000, word specification 1001, a decode specification 1002, and a snapshot specification 1003, all of which are utilized to instruct the workflow service 310 to process messages, events and responses as discussed above.

Variable specification 1000 is static data located in the SDS 350a that are used by the workflow service 310 to execute various tasks required by SEAMs (221-264). Variable specification 1000 in the SDS 350a does not change and comprises a global identification symbol, a start bit, a storage type, a usage type, an engineering unit scale factor, an engineering unit offset factor, an initial value, and index to the DDS 350b, a bit size, a persistence indicator, a source assembly and a sampling frequency. A variable offset factor 1004 contains a start bit and a variable decode mask pointer and one or more additional pointers that point to specific variables 1000 required to execute a task.

Word specifications 1001 in the SDS 350*a* comprise static 32 bit memory locations that contain a list of ID's for variables 1000 contained within a word. Words also comprise a unique word ID, a source message and decode masks in their various forms as may be practiced in the art.

Decode Specifications (Decode Specs) 1002 are static data structures that contain a list of ID's for various words 1001. The words are defined for each data element (field) in the message. For each data element, the decode specification contains information about the location (offset) within the message, its size, its data type and similar information for use by the runtime code. Decode specifications also comprise Message type indicators to identify instances of a message(s). Input/output message buffers 390, circular buffers 380, snapshot specifications, trend specifications and report specifications all have individual data structures and a corresponding decode specification.

Snapshot specifications are static storage locations that contain data records that define a times series or a "snapshot" of data that is recorded (i.e., captured) in regard to some component in a complex system. Snapshot specifications also contain a snapshot type ID, a trigger algorithm, data retention rules, a trigger event, a collection interval, snapshot inhibits, append interval times, persistence indicators, and pointer which points to a decode specification data structure for the snapshot specification. A snapshot type ID uniquely identifies a snapshot specification. A snapshot Id is a unique identifier for each instance of a snapshot type that is recorded. The snapshot ID identifies a particular "batch" of data captured according to the specification (A, B, C . . . n) and has a unique batch identifier (1, 2, 3 . . . n).

By utilizing a MNT node computing device, a system user 210 may access an EHM node 120', AHM node 130' or VHM node 140' and add to its functionality by creating a SDS extension 1010 within non-static DDS 350*b*. Each component of the SDS extension is logically linked to its static counterpart in the SDS 350*a* such that the SDS extension 1010 appears to the workflow service 310 to be the static SDS 350*a*. Thus, the SDS extension 1010 comprises a variables extension 1005, a Words extension 1011, a decode specification extension 1012, a snapshot specification extension 1013 and its variable storage extension 1021.

Figure 10:
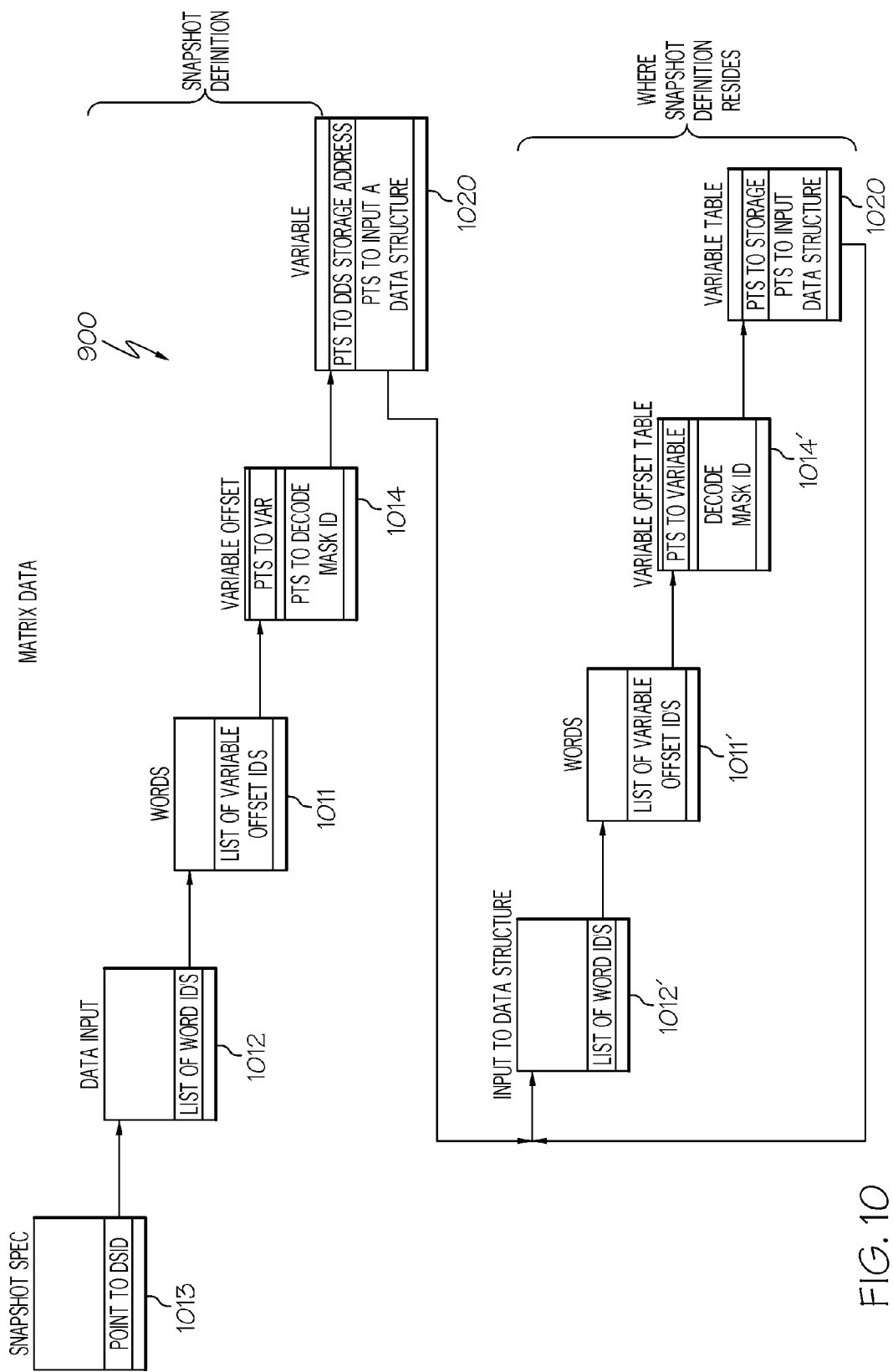
FIG. 10 is an abstract relationship diagram between the various SDS extensions.

FIG. 10 presents a simplified illustration of the interrelationships between the various data that make up the matrix data 900, which includes snapshot specification extensions 1013, decode specification extensions, Data Structure (Decode) specification extensions 1012, word specification extensions 1011, variable offset extensions 1014, and variable specification extensions 1005. Thus, the upper set of boxes 1010-1014, along with variables 1020, comprises the data snapshot definition.

Variable storage area 1020 (See also FIG. 9 is the normal storage area of the DDS 350*b* that is referenced by the SDS 350*a* for variables. However, the variable storage extension 1021 is an extension to that variable storage area 1020 and is referenced via the variable extension 1005 for variables introduced from the matrix data received from the MNT node 150'. The data matrix also contains information as to where the data from the data matrix will be found in the DDS 350*b*. That would include a similar set of data 1011'-1014' and variable instances 1021.

Figure 11A:
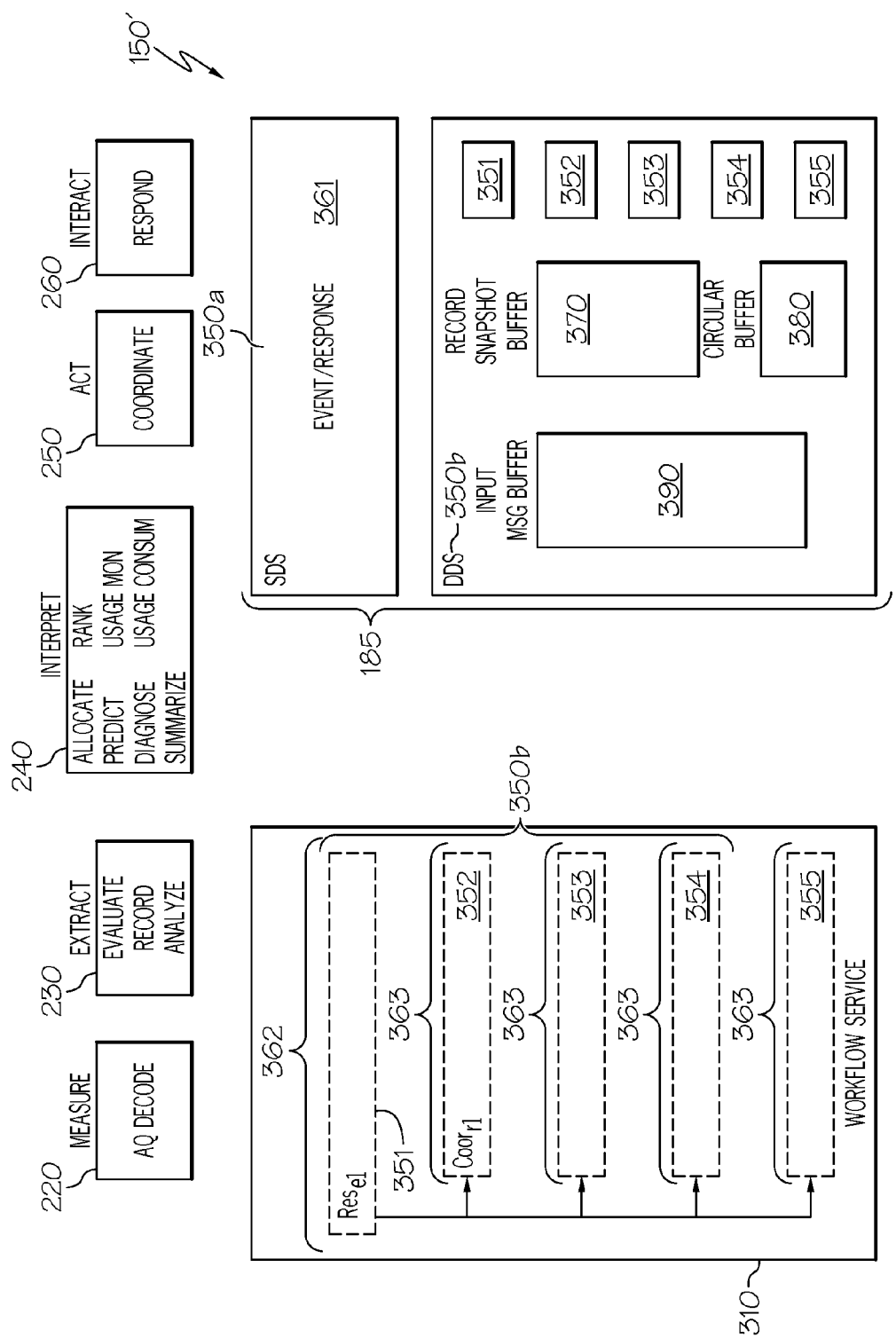
FIG. 11a is simplified block diagrams of an exemplary Maintainer computing node SDS, DDS and workflow service with an exemplary event flow stream for sending a command and a function augmentation data matrix to a lower level computing node.
Figure 11B:
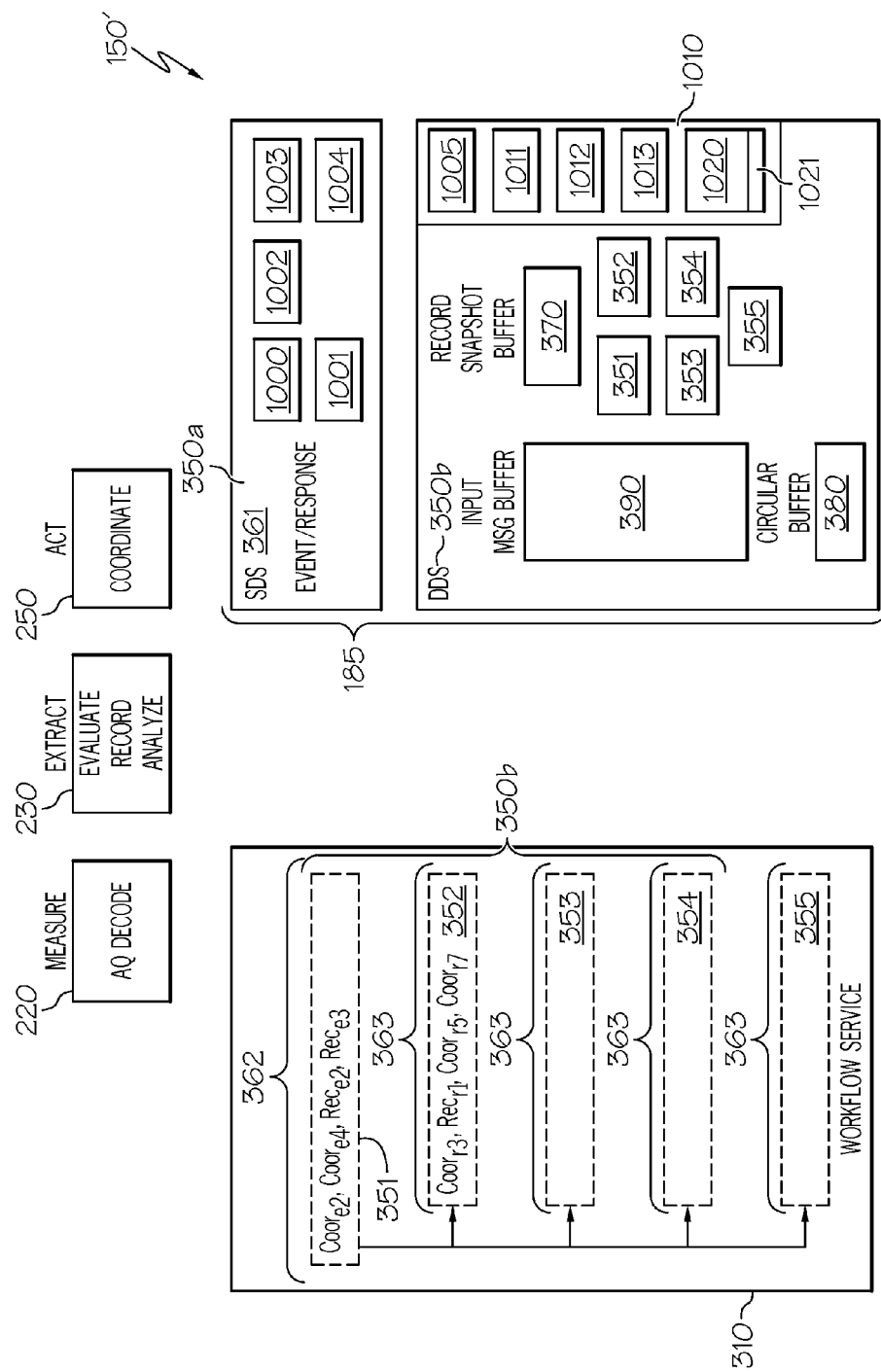
FIG. 11b is simplified block diagrams of an exemplary lower level computing node SDS, DDS and workflow service with an exemplary event flow stream for augmenting the capabilities of the lower level computing node from the function augmentation data matrix.
Figure 11C:
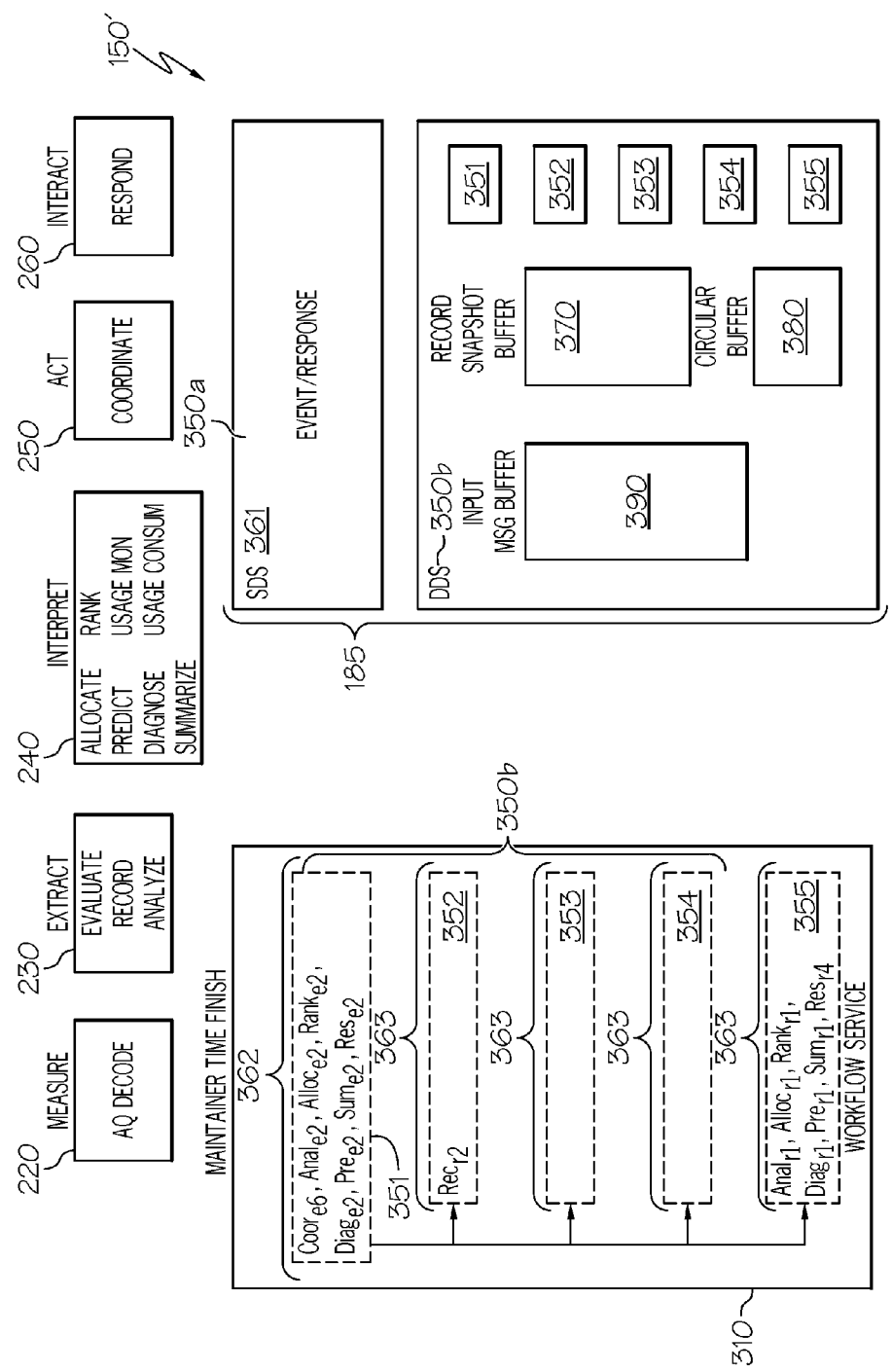
FIG. 11c is simplified block diagrams of an exemplary Maintainer computing node SDS, DDS and workflow service with an exemplary event flow stream for receiving and processing data from a lower level computing node.

FIGS. 11*a-c* are simplified block diagrams of an exemplary MNT node 150' (11*a* and 11*c*) and an exemplary lower level node (11*b*), each which includes SDS extension components and additional SEAMs populated therein which will be discussed herein below separately in the interest of brevity and clarity. However, it should be understood that various SEAMs (221-264), events 362 and response records 363 may include incremental additions to those described above in regard to FIGS. 7 and 8 that differentiate an MNT node from an EHM, AHM or a VHM node. This is particularly so because uniquely to a MNT node, an MNT node may allow a user to modify the functionality of a lower level node in real time, thereby dispensing with the need to recompile and reload operating code. By using a GUI 461 and a web browser 460, a user creates a function augmentation data matrix 900 defining what data needs to be collected/analyzed by which node (120-160) and includes specifics as to how and when such tasks should be performed. The function augmentation data matrix 900 (See FIG. 10) accompanies a user request message 362 (i.e. a user instruction UI) that is received from the originating MNT node 150' at a lower level node (120'-140') and is pushed in to EVQ 351 for processing by the workflow service of the lower level node.

As may be discerned from inspection of FIG. 11*a*, a node configured as an MNT node 150' includes SEAMs from the Interpret library 240, Act Library 250 and the Interact library 260. Specifically, the exemplary MNT node 150' includes an exemplary compliment of additional SEAMs including an Allocate Seam 241, a Rank Seam 243, a Predict SEAM 244, a Summarize SEAM 247, a Usage Monitoring SEAM 246, a Consumption Monitoring SEAM 245, a Coordinate Seam 252 and a Respond SEAM 261. This additional compliment of SEAMs allows the MNT node 150' to communicate with a user via the user interface 461 and to modify the functionality of lower level nodes such as an EHM, and AHM and a VHM.

Some of the events generated by the Interpret, Act and Interact libraries (250-260) (e.g., UI, RES, AL, RK, SUM) are associated with user interface and user reporting functions that are much less time sensitive given the perception time of a human being and because they are events that concern a final product. Hence, events 362 generated by SEAMs from the Interpret, Act and Interact libraries (240-260) are typically assigned the lowest priority for execution by the workflow server. As such, the response records 363 generated from these events 362 are assigned to the Asynchronous queue 355 and are addressed by the workflow service 310 after all of the response records 363 slotted into the higher priority queues (351-354) have been completed. If response records 363 in the AQ 355 are being executed by the workflow service 310 and a higher priority response record 363 is received, the workflow service 310 ceases work on the AQ 355 until the higher priority response records 363 are addressed and resolved. As such, the response records 363 in the AQ 355 are typically addressed last and in a serial like fashion.

As mentioned above, a MNT node 150' has the capability of modifying the operation of a lower level node (i.e., EHM, AHM or VHM) in essentially real time. This allows a system user 210 to collect and or process data in an ad hoc manner to investigate emergent health maintenance issues. For example, a system user 210 may instruct an AHM node 130' to gather data about a component being monitored by a particular EHM node 120' that may not be under its normal supervision and to process the data with other stipulated data in order to investigate a particular health anomaly. This is done by directing the lower level node to create an SDS extension 1010 (See FIG. 9) of the SDS 350*a* within the DDS 350*b*. This technique does not require taking down the system to reconfigure, and reload the DDS 350*b* and the SDS 350*a*. It also allows the change to remain a temporary modification.

SDS extension 1010 may be persistent or may be volatile. Typically the SDS extensions 1010 are volatile and erase when powered off as is typical with data stored in volatile memory such as RAM. The SDS extension 1010 may be made persistent if a flag is set by the system user 210 to indicate that the data should be stored in persistent memory such as a flash memory device prior to power down and reloaded from the persistent memory into the DDS 350b at power up.

FIGS. 11a and 11c are simplified block diagrams of an MNT node 150' populated with exemplary messages and events in queue that cause a lower level computing node 120-140 to alter its functionality. FIG. 11a illustrates exemplary event flow for sending a request for information and FIG. 11c illustrates an exemplary event flow for receiving the information. FIG. 11b illustrates an exemplary event flow for the lower level node (i.e. an EHM node 120') that creates the SDS extension 1010 into the DDS and executes the data collection. Messages and events are processed according to the method flow diagram of FIG. 12 that will be more fully discussed below and is discussed in regard to FIG. 13 of related application Ser. No. 13/077,276, which is incorporated herein in its entirety.

As an operational example (See FIG. 11a), the host executive software 330 pushes an input message US1 into the MNT node 150' received from the user web browser 460 that includes a function augmentation data matrix 900 extracted from the user's web page as is known in the art. The message also includes a command from the user interface that requests specific data from a lower level node (e.g., an EHM) that the lower level node is not configured to provide. The user generated matrix includes a variety of data that identifies nodes, complex system components, sensors and other data related to the data requested. The content of the matrix is situation specific. However, the matrix itself and its construction would be well known to those of ordinary skill in the art as a normal web function.

Once the MNT node receives the matrix and the message from the web server 430 (FIG. 4), the host executive software 330 at the MNT node 150' calls a customized adapter 325 which in turn calls the appropriate SEAM (221-264) resident in the MNT node 150' based on data included in the message. In other embodiments the input message may be generated by another SEAM (221-264) and the event $RES_1$ pushed into the EVQ 351 by that SEAM.

The MNT customized adapter 325 calls the Respond SEAM 261 which is based on the message type. The Respond SEAM 261 places the $US_1$ message into a message queue 390 and queries the SDS 350a for instructions for the disposition of the data matrix and the request for a snapshot. The Respond SEAM 261 in this example receives its instructions from the SDS 350a and when completed generates a Respond event ($RESe_1$) which is placed in the event queue 351 for further processing. Once the input message $US_1$ is placed in a message queue 390 and its corresponding event 362 $RESe_1$ is placed into the EVQ 351, then the Respond SEAM 261 exits and turns control to the workflow service module 310 via return message 364 (See FIG. 12). In this simple example, only a single processor processing a single command thread is assumed, although multiple threads may operate in parallel on the same queues.

The workflow service 310 of the MNT node then reads the next highest priority event, which in this simple example is the $RESe_1$ event. The workflow service then refers to the SDS 350a for instructions for the disposition of the $RESe_1$ event, which in this case produces a $COORr_1$ response that would direct the MNT node to route the snapshot command and the data matrix to a particular lower level node, such as an EHM node 120', that was designated in the data matrix. The Workflow service 310 of the MNT node 150' then calls the specialized adapter 325 which sends the snapshot command and the data matrix to the EHM via the communication system 9.

At the EHM node 120', the specialized adapter 325 of the EHM receives the message from the MNT node 150' and pushes the message into the event queue 351 of the EHM node 120'. Thus, the receipt of message is handled in the same manner as the message in the Data acquisition example of FIG. 8.

Based on the type of message received, the specialized adapter 325 calls the Coordinate SEAM 252. The Coordinate SEAM 252 consults the EHM SDS 350a to determine the appropriate response record 362. The proper response in this example indicated by the SDS 350a is to direct EHM node 120' to receive the snapshot command and the data matrix included in the message. When the workflow service has finished with the message the Coordinate SEAM 252 generates an event $COORe_2$ and places event $COORe_2$ into the EVQ 351.

The workflow service 310 of the EHM then processes the next event record 362 in the EVQ 351, which in this example happens to be $COORe_2$. The workflow service 310 then consults the SDS 350a to determine the proper response record 363, which in this example is $COORr_3$ which is placed in the HP queue 352.

Because at this point there are no unprocessed events in the EVQ 351, the Workflow service 310 moves to the HP queue 352 and takes up the first response record, which in this case is $COORr_3$. The workflow service calls the Coordinate SEAM 252, which directs the EHM node 120' to process an ad hoc data snapshot of a component and to set up the SDS extensions 1010 into the DDS 350b (See FIG. 9). The SDS extensions 1010 hold the function augmentation data matrix data 900 for the SEAMs (241-261) containing the variables 1020 directing how to process the snapshot data requested based on the data matrix received in the user message. Once the $COORr_3$ response record has been completed, an event $COORe_4$ is generated in the EVQ 351 and the SDS extension 1010 is populated with the data from the coordinate message implementing user message $US_1$.

Because there is now an event in the EVQ 351, the workflow service takes the next event in queue (i.e. $COORe_4$) and consults the SDS 350a for the proper response, which is a $RECr_1$ and a $COORr_5$ response records. The $RECr_1$ and a $COORr_5$ response records are placed into the HP Queue 352.

The EVQ 351 being empty, the workflow service 310 moves to the first response record in the HP queue 352, which is the $RECr_1$ response record. The Record Seam 234 is called by the workflow service 310, which queries the SDS Extension 1010 for the function augmentation matrix data 900 to begin recording the data snapshot event based on that data. Upon completing the initiation of the snapshot event, the Record SEAM places an event $RECe_2$ into the EVQ 351. Sequentially, the workflow service 310 also picks up the $COORr_5$ response record and calls the Coordinate SEAM 252, to send a confirmation message to the MNT node 150' that the data snapshot has been started based on those instructions.

At the MNT Node 150' (FIG. 11c) the specialized adapter 325 receives the confirmation message from the EHM node 120' that the snapshot has started places it in the message queue 390 into the event queue 351. Based on the type of message received, the MNT specialized adapter 325 calls the Coordinate SEAM 252 which receives the message that the data collection for the snapshot has begun.

Returning to the EHM Node 120' (FIG. 11b), when the data collection for the snapshot is completed, the Record SEAM 234 generates an event $RECe_3$ in the EVQ 351. The workflow service 310 then reads RECe₃ from the EVQ 351 and queries the SDS 350a for a proper response record. The workflow service 310 then files a COORr₇ response record in the HP queue 352 of the EHM node 120'. The COORr₇ response record instructs the EHM to send a "snapshot completed" message to the MNT node 150' with the results.

The Workflow Service 310 serially reads the COORr₇ response record and calls the Coordinate SEAM 252, which generates a snapshot complete message for the MNT node 150', which includes the collected snapshot data and delivers it to the specialized adapter 325 for delivery to the MNT node 150' via communication system 9.

The MNT node 150' receives the snapshot complete message and its specialized adapter 325 pushes the message on to the message queue 390 and calls the MNT Coordinate SEAM 252. The Coordinate SEAM 252 consults the SDS 350a and determines the proper response to the message, which in this example is a Coor$_{e6}$ event record and places it in the EVQ 351 for further processing.

The Workflow service 310 of the MNT serially reads the COOR$_{e6}$ event record and consults the SDS 350a, which returns an ANALr₁ response record instructing the node to analyze the snapshot data received from the EHM node 120'. The ANALr₁ response is placed in the asynchronous queue 355, which is the lowest priority queue. This is so because operations having to do with reports and other human interaction are not time sensitive because the human user cannot perceive the slight time delays resulting form the lower priority. Placing these types of response records in the lowest priority queue allows higher priority events and responses required for real time performance to be addressed faster in the higher priority queues.

The ANALr₁ response record is serially read by the workflow service 310 which calls the Analyze SEAM 232 to analyze the snapshot data. The Analyze SEAM consults the SDS 350a for the proper event response. When complete the Analyze SEAM places an ANALe₂ event into the EVQ 351. The Workflow service 310 serially reads the ANALe₂ event and consults the SDS 350a, which returns an ALLOCr₁ response record, which is placed in the asynchronous queue 355, instructing the node to perform allocation.

Figure 12:
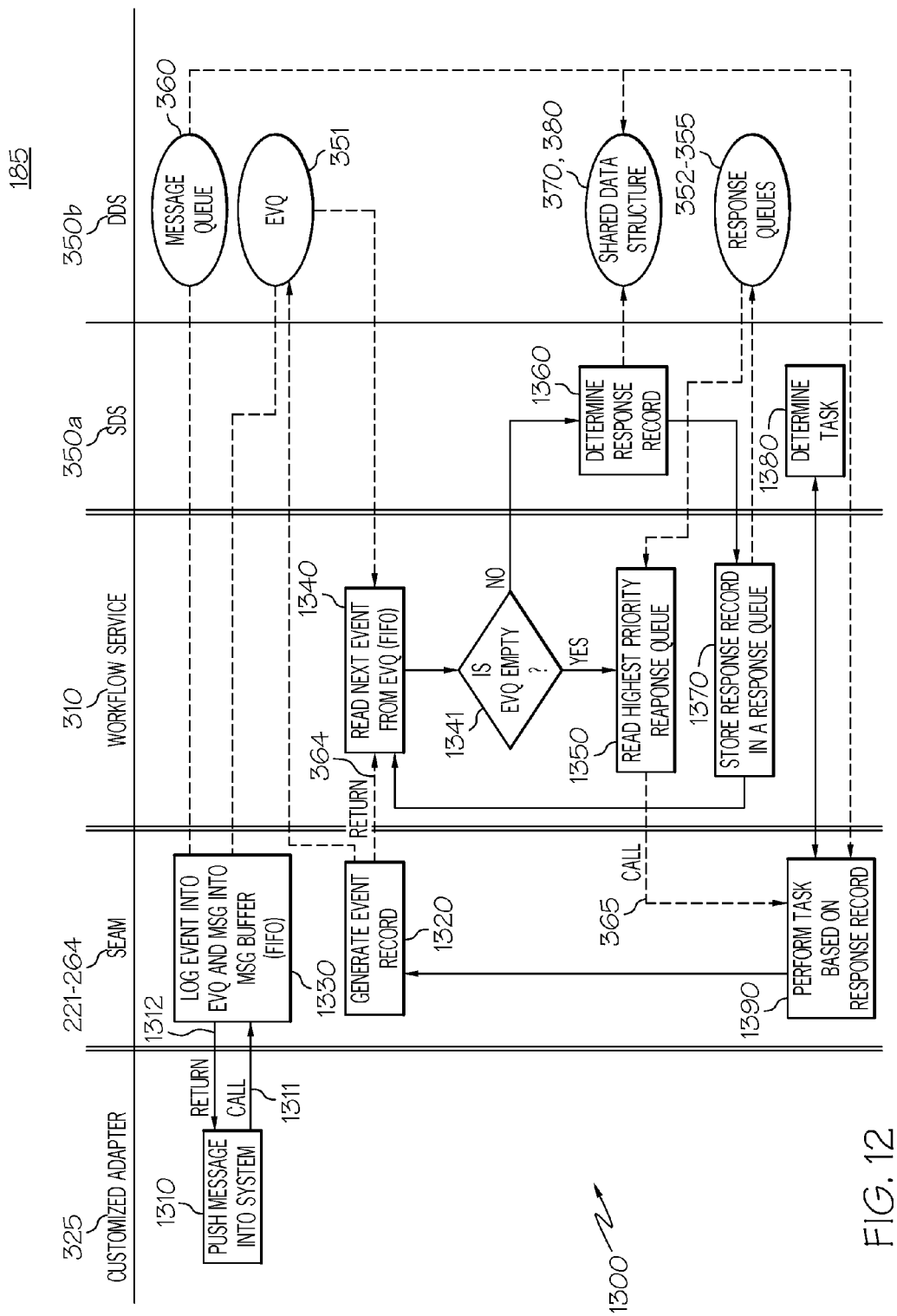
FIG. 12 is a simplified logic flow diagram of an exemplary method for coordinating functions of a computing device to accomplish a task.

The process continues in a serial fashion according to the procedure illustrated in FIG. 12 (and utilized above) as the workflow service 310 serially moves through the asynchronous queue 355. The ALLOCr₁, RANKr₁, DIAGr₁, PRE r₁, SUMr₁ and RESr₄ are all response records for execution by their indicated SEAMS (Allocate 241, Rank 243, Diagnose 242, Predict 244, Summarize 247 and Respond 261). The ANALe₂, ALLOCe₂, RANKe₂, DIAGe₂, PREe₂, SUMe₂ and RESe₃ events are all indications that the respective SEAMS have completed the tasks indicated by the chain of response records listed above. The final RESr₄ response record directs the MNT node 150' to deliver the requested data to the system user 210 via the specialized adapter 325 and the web server 430.

FIG. 12 is a simplified flow chart of a method 1300 for coordinating the operation of various SEAMs (221-264) within a computing node (120'-170'). However, those of ordinary skill in the art will appreciate that the use of multiple processors will allow for multiple threads to be processed in parallel.

At process 1310, an event 362 is pushed into the system by the customized adapter 325 or, in the case of some EHM nodes 120' by the host executive software 330. In some embodiments, the host executive 330 may make a function call 1311 to a SEAM (221-264) to accept the event message such as the Acquire SEAM 221. At process 1330, the event record 362 is placed into the EVQ 351 by the called Seam (221-264) in the order in which it was received and the input message is stored in a queue or a message buffer 390 resident in the DDS 350b by the SEAM (221-264). The SEAM (221-264) then sends a return command 1312 to the customized adapter 325 and exits.

It is assumed in this simple example, the workflow service module 310 had no other events or response records to process. Therefore the workflow service module 310 may restart at process 1340, although it may restart at any point in its routine. At process 1340, the workflow service module 310 attempts to read the next event record in FIFO order from the EVQ 351. If it is determined that the EVQ 351 is not empty at decision point 1341, then the workflow service module 310 reads the next event 362 from the EVQ and then consults the persistent data (e.g., a state machine) in the SDS 350a with the event 362.

At process 1360, the SDS 350a receives the event 362 as an input and produces a predefined response record 363. The SDS 350a also indicates the response queue (352-355) into which the response record 363 is to be placed, and indicates a priority location for the response record in the response queue as. Any data associated with an event/response record is stored in a shared data structure in the DDS 350b, such as in a circular buffer 380 or in a record snapshot buffer 370.

At process 1370, the workflow service module 310 stores the response record 363 into the assigned response queue (352-355) in its priority order and then returns to process 1340 to read the next event 362.

When the SDS 350a assigns response queues, the highest priority response records 363 are placed in the HPQ 352 in their order of assigned priority and not on a FIFO basis. Response records 363 of lesser priority, such as responses records requiring a time delay may be placed in the TDQ 535. Responses records 363 of still lesser priority may be placed in the PQ 354. Such response records 363 in the PQ 354 may need to be addressed only on a periodic basis, for example. Response records 363 of the least priority are assigned to the AQ 355 and may be addressed asynchronously as the higher priority response queues permit. Further, response records 363 are placed into one of the response queues 353-355 according to a processing priority that is assigned by the SDS 350a and may or may not be placed on a FIFO basis. The above described loop (1340, 1360, 1370) continues for as long as there are events 362 in the EVQ 351.

If the EVQ 351 is determined to be empty at determination point 1341, then the workflow service module 310 proceeds to the highest priority response queue (352-355) that contains a response record 363 and reads the highest priority response record (e.g. the first or the next response record), at process 1350. When a response record 363 is read, the workflow service module 310 issues a function call 365 to the SEAM (221-264) referenced in the response record 363 to perform its function on the data indicated in the response record 363 and then exits.

At process 1380, the called SEAM (221-264) consults the SDS 350a to determine the task to be performed by the SEAM. Although not strictly required for simple SEAM functions such as the Acquire SEAM 221, more complex SEAMs such as the Forecast SEAM 255 or the Coordinate SEAM 252, for example, may have various alternative algorithms or conditional logic that may be performed. As such the SDS 350a, may direct the SEAM as to which explicit functionality or algorithm to execute.

At process 1390, the designated SEAM performs its function or task on the data associated with the response record 363. Once the SEAM 221-264 performs its function, the method 1300 proceeds to process 1320 where a new event record is generated and placed into the EVQ 351 and the method 1300 repeats.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for extending the functionality of a subordinate computing device without re-compiling code, comprising:
    a controlling computing device, wherein the controlling computing device and the subordinate computing device each comprise:
        a first plurality of standardized executable application modules (SEAMs), each SEAM configured to execute on a processor to provide a unique function and to generate an event associated with the unique function associated with each SEAM;
        a computer readable storage medium having a configuration file recorded thereon, the computer readable storage medium comprising: a dynamic data store (DDS) and a static data store (SDS),
            wherein the DDS comprises an event queue, one or more response queues and one or more unused storage locations, and
            wherein the SDS comprises variables, words, a decode specification, a snapshot specification, a variable offset specification, and a persistent software object configured to map a specific event from the event queue to a pre-defined response record, and to assign a response queue into which the pre-defined response record is to be placed; and
        a workflow service module configured to direct communication between the SDS, the DDS and each of the first plurality of SEAMs;
    wherein the controlling computing device is configured to transmit a command and a data matrix containing data to the subordinate computing device,
    wherein the subordinate computing device is configured to create a linked extension of the SDS in an unused storage location of the DDS in response to the command and to populate the extension of the SDS with the data contained in the data matrix, and
    wherein the SDS snapshot specification points to a data structure, the data structure points to a list of words, each word in the list of words points to at least one variable offset, the at least one variable offset specification points to a variable and to a preexisting decode mask, the variable points to a storage address within the DDS and to the function augmentation data matrix.

2. The system of claim 1, wherein the input data matrix points to a data structure extension ID, the data structure extension ID points to a extension list of word IDs, the extension list of word IDs points to at least one extension variable offset, the at least one extension variable offset points to a variable extension and a extension decode mask ID, the extension variable points to a storage address of the DDS and back to the data matrix.

3. The system of claim 1, wherein a SEAM of the first plurality of SEAMs is instructed to create multiple extension areas within the unused storage location of the DDS and logically link each of the multiple extension areas to a related memory location within the SDS.

4. The system of claim 3, wherein a third SEAM of the first plurality of SEAMs populates each extension area of the multiple extension areas from the data matrix.

5. The system of claim 4 wherein at least two of the first SEAM, the Second SEAM and the third SEAM are the same SEAM but with different instructions determined from the SDS.

6. A method for augmenting functions of a subordinate computing device by a controlling computing device where the subordinate computing device and the controlling computing device both include a workflow service, a dynamic data store (DDS), a static data store (SDS), and are both populated by at least a first set of standardized executable application modules (SEAMs), the method comprising:
    receiving a command and a function augmentation data matrix from the controlling computing device, wherein the function augmentation data matrix contains data that when installed in the DDS of the subordinate computing device enables the subordinate computing device to accomplish additional functions;
    calling a first SEAM by the subordinate computing device, the first SEAM being configured to receive the command and the function augmentation data matrix;
    calling a second SEAM by the subordinate computing device, the second SEAM being configured to create one or more SDS extensions in its DDS; and
    populating the one or more DDS extensions with the data from the function augmentation data matrix,
    wherein:
        the SDS comprises variables, words, a decode specification, a snapshot specification, and a variable offset specification, and
        the SDS snapshot specification points to a data structure, the data structure points to a list of words, each word in the list of words points to at least one variable offset specification, the at least one variable offset specification points to a variable and to a preexisting decode mask, the variable points to a storage address within the DDS and to the function augmentation data matrix.

7. The method of claim 6, wherein the function augmentation data matrix points to a data structure, the data structure points to a list of words, each word in the list of words points to at least one variable offset specification, the at least one variable offset specification points to a variable and to a preexisting decode mask, the variable points to the function augmentation data matrix.

8. The method of claim 6, wherein the input data matrix points to a data structure extension ID, the data structure extension ID points to a extension list of word IDs, the extension list of word IDs points to at least one extension variable offset, the at least one extension variable offset points to a variable extension and a extension decode mask ID, the extension variable points to a storage address of the DDS and back to the data matrix.

9. The method of claim 6, wherein a SEAM of the first plurality of SEAMs is instructed to create multiple extension areas within the unused storage location of the DDS and to logically link each of the multiple extension areas to a related memory location within the SDS.

10. The method of claim 9, wherein a third SEAM of the first plurality of SEAMs populates each extension area of the multiple extension areas from the function augmentation data matrix.

11. The method of claim 10, wherein at least two of the first SEAM, the second SEAM and the third SEAM are the same SEAM but with different instructions determined from the SDS.

12. A non-transitory computer readable storage device containing instructions that when executed augments the functions of a subordinate computing device by a controlling computing device where the subordinate computing device and the controlling computing device both include a workflow service, a dynamic data store (DDS), a static data store (SDS), and are both populated by at least a first set of standardized executable application modules (SEAMs), the steps comprising:

receiving a command and a function augmentation data matrix from the controlling computing device, wherein the function augmentation data matrix contains data that when installed in the DDS of the subordinate computing device enables the subordinate computing device to accomplish additional functions;

calling a first SEAM by the subordinate computing device, the first SEAM being configured to receive the command and the function augmentation data matrix;

calling a second SEAM by the subordinate computing device, the second SEAM being configured to create one or more SDS extensions in its DDS; and populating the one or more DDS extensions with the data from the function augmentation data matrix, wherein:

the SDS comprises variables, words, a decode specification, a snapshot specification, and a variable offset specification, and the SDS snapshot specification points to a data structure, the data structure points to a list of words, each word in the list of words points to at least one variable offset specification, the at least one variable offset specification points to a variable and to a preexisting decode mask, the variable points to a storage address within the DDS and to the function augmentation data matrix.

\* \* \* \* \*